US010330027B1

(12) United States Patent
Glugla

(10) Patent No.: US 10,330,027 B1
(45) Date of Patent: Jun. 25, 2019

(54) SYSTEMS AND METHODS FOR TORQUE BUMP MITIGATION IN A VARIABLE DISPLACEMENT ENGINE

(71) Applicant: Ford Global Technologies, LLC, Dearborn, MI (US)

(72) Inventor: Christopher Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/874,681

(22) Filed: Jan. 18, 2018

(51) Int. Cl.
| | |
|---|---|
| *F02D 17/02* | (2006.01) |
| *F02D 41/00* | (2006.01) |
| *F02D 41/14* | (2006.01) |
| *F02D 35/02* | (2006.01) |
| *F02P 5/15* | (2006.01) |

(52) U.S. Cl.
CPC .......... *F02D 17/02* (2013.01); *F02D 35/028* (2013.01); *F02D 41/0087* (2013.01); *F02D 41/1497* (2013.01); *F02P 5/1512* (2013.01); *F02D 2200/024* (2013.01); *F02D 2200/101* (2013.01)

(58) Field of Classification Search
CPC .... F02D 17/02; F02D 35/028; F02D 41/1497; F02D 41/0087; F02D 13/06; F02D 2200/101; F02D 2200/024; F02D 2250/18; F02P 5/1512
USPC ............... 123/481, 198 F, 436; 701/110–113
See application file for complete search history.

(56) References Cited

U.S. PATENT DOCUMENTS

| | | | |
|---|---|---|---|
| 7,900,509 B2 | 3/2011 | Feldkamp et al. | |
| 8,150,605 B2 * | 4/2012 | Doering | F02D 13/06 123/198 F |
| 8,352,153 B2 * | 1/2013 | Gibson | F02D 13/0261 123/179.4 |
| 8,601,862 B1 * | 12/2013 | Bowman | F02D 41/0097 73/114.04 |
| 9,261,067 B2 | 2/2016 | Glugla et al. | |
| 9,273,622 B2 * | 3/2016 | Glugla | F02D 41/1498 |
| 9,371,783 B2 * | 6/2016 | Surnilla | F02D 41/12 |
| 9,470,185 B2 * | 10/2016 | Dudar | F02M 25/0809 |

(Continued)

FOREIGN PATENT DOCUMENTS

WO      2010006321 A2      1/2010

OTHER PUBLICATIONS

Wilcutts, M. et al., "Design and Benefits of Dynamic Skip Fire Strategies for Cylinder Deactivated Engines," SAE International, vol. 6, No. 2, Apr. 8, 2013, 11 pages.

(Continued)

*Primary Examiner* — Hai H Huynh
(74) *Attorney, Agent, or Firm* — Julia Voutyras; McCoy Russell LLP

(57) ABSTRACT

Methods and systems are provided for reducing or avoiding a torque bump resulting from unintended combustion in a deactivated cylinder of a variable displacement engine. In one example, a method includes reducing or avoiding a torque bump associated with an engine of a vehicle while one or more cylinders of the engine are deactivated by reducing a torque output of the engine by an amount substantially equivalent to a torque increase provided to the engine via the unintended combustion event. In this way, undesired torque bumps may be avoided when operating in VDE mode, which may improve customer satisfaction, and which may enable improved fuel economy and engine efficiency.

19 Claims, 12 Drawing Sheets

(56) References Cited

U.S. PATENT DOCUMENTS

| | | |
|---|---|---|
| 9,551,288 B2 | 1/2017 | Glugla et al. |
| 9,605,601 B2 | 3/2017 | Leone et al. |
| 9,732,686 B2 * | 8/2017 | Glugla ................ F02D 41/0055 |
| 9,797,327 B2 | 10/2017 | Glugla et al. |
| 10,167,787 B1 * | 1/2019 | Glugla .................... F02D 37/02 |
| 2011/0094475 A1 | 4/2011 | Riegel et al. |
| 2015/0354477 A1 | 12/2015 | Leone et al. |
| 2016/0003168 A1 | 1/2016 | Leone et al. |
| 2017/0350332 A1 * | 12/2017 | Martin ................ F02D 41/0087 |
| 2018/0216562 A1 * | 8/2018 | Dudar .................... F02D 13/06 |

OTHER PUBLICATIONS

Chen, S. et al., "Misfire Detection in a Dynamic Skip Fire Engine," SAE International, vol. 8, No. 2, Apr. 14, 2015, 10 pages.
Glugla, C., "Systems and Methods for Preventing Spark Plug Fouling in a Variable Displacement Engine," U.S. Appl. No. 15/874,626, filed Jan. 18, 2018, 96 pages.

* cited by examiner

SYSTEMS AND METHODS FOR TORQUE BUMP MITIGATION IN A VARIABLE DISPLACEMENT ENGINE

FIELD

The present description relates generally to methods and systems for controlling a vehicle engine to reduce or avoid torque disturbance due to an unintended combustion event occurring in a deactivated cylinder of a variable displacement engine.

BACKGROUND/SUMMARY

Engines may be configured to operate with a variable number of active or deactivated cylinders to increase fuel economy, while optionally maintaining the overall exhaust mixture air-fuel ratio about stoichiometry. Such engines are known as variable displacement engines (VDE). In some examples, a portion of an engine's cylinders may be disabled during selected conditions, where the selected conditions can be defined by parameters such as a speed/load window, as well as various other operating conditions including vehicle speed. A VDE control system may disable selected cylinders through the control of a plurality of cylinder valve deactivators that affect the operation of the cylinder's intake and exhaust valves, or through the control of a plurality of selectively deactivatable fuel injectors that affect cylinder fueling. By reducing displacement under low torque request situations, the engine is operated at a higher manifold pressure, reducing engine friction due to pumping, and resulting in reduced fuel consumption.

There are a few examples of how deactivating engine cylinders is typically conducted in a four-stroke engine that includes intake, compression, combustion (power), and exhaust strokes. In a first example, during the intake stroke an air-fuel charge is drawn into the cylinder, the air-fuel charge is compressed, spark is provided resulting in combustion, but rather than exhausting the combustion gases, the exhaust valve is maintained closed. This traps the high-pressure charge in the cylinder. An advantage to this methodology is lower oil migration/consumption as the high pressure in the deactivated cylinder prevents migration of oil into the cylinder. However, such a method has a distinct disadvantage in that there is a noticeable torque bump at deactivation, and a pumping penalty is realized for the first event after deactivation (which is small if deactivating for short periods, but significant if deactivated and reactivated often).

Another example of cylinder deactivation includes the same steps as above in the first example, but rather than trapping the high-pressure charge, the cylinder is exhausted, but rather than re-inducting an intake charge after the exhaust stroke, a vacuum is trapped in the cylinder by closing the exhaust valve (while maintaining closed the intake valve). Such an example has an advantage over the first example, in that there is a reduction in noticeable torque bump at deactivation, and increased fuel efficiency when deactivated and activated often, due to lower pumping work. However, a distinct disadvantage to such methodology is that by trapping the vacuum in the cylinder, oil consumption may increase. Increased oil consumption may result in at least two undesirable issues. The first may include oil fouled spark plug(s). A second issue may include the fact that crankcase vapors and/or oil migrating from a crankcase to the cylinder may result in a combustible mixture, which may result in a combustion event in the cylinder. Disabling spark during cylinder deactivation may prevent unintended combustion of crankcase vapors/oil migration, however oil fouling and oil migration may still result in spark plug degradation (spark plug fouling).

U.S. Pat. No. 9,261,067 B2 teaches a method for reducing spark plug fouling in deactivated cylinder(s), comprising supplying spark at a particular determined instance while the cylinder(s) are deactivated. However, the inventors have recognized an issue with such an approach. For example, the supplying of spark is not specified with relation to engine cycle status, or position of a piston(s) coupled to the cylinder(s). As such, providing spark according to U.S. Pat. No. 9,261,067 B2 may result in undesired combustion events while the cylinder(s) is deactivated.

Furthermore, in the event of unintended combustion, even if mitigating actions are taken to avoid such unintended combustion, a noticeable torque bump may result and residual combustion gases in the cylinder that was the source of the unintended combustion may result in inefficient combustion upon reactivation of the particular cylinder. The inventors have herein recognized these issues, and have developed systems and methods to at least partially address them. In one example, a method comprises deactivating a subset of cylinders of a variable displacement engine while other cylinders of the engine combust air and fuel, reducing or avoiding a torque bump due to an unintended combustion event in a deactivated cylinder by reducing a torque output of the engine and reactivating the deactivated cylinder which had the unintended combustion event, and during subsequent cylinder deactivation events, not deactivating the cylinder which had the unintended combustion event. In this way, under conditions where an unintended combustion event occurs while operating the engine with deactivated cylinders, a torque bump associated with the unintended combustion event may be reduced or avoided, which may improve engine efficiency and which may improve customer satisfaction.

In one example of the method, the unintended combustion event includes an acceleration of a crankshaft coupled to the engine greater than a threshold crankshaft acceleration. Furthermore, in some examples, the method may include exhausting residual burnt gas from the deactivated cylinder with the unintended combustion event prior to reactivating the deactivated cylinder with the unintended combustion event.

In another example of the method, reducing the torque output of the engine may comprise reducing a torque contribution of an activated cylinder that is scheduled to combust air and fuel immediately following the unintended combustion event. In such an example, reducing the torque contribution of the activated cylinder may further comprise retarding a spark provided to the activated cylinder for combustion of air and fuel, where an amount that the spark is retarded is a function of a torque increase provided to the engine via the unintended combustion event.

Still further, in an example of the method, the method may further comprise deactivating the subset of cylinders of the engine via trapping either a negative pressure with respect to atmospheric pressure or a positive pressure with respect to atmospheric pressure in the subset of cylinders. As one example, trapping the negative pressure may be in response to an indication that an oil quality of an oil utilized for cooling, lubrication and/or cleaning of the engine is greater than an oil quality threshold, and wherein trapping the positive pressure may be in response to an indication that the oil quality of the oil is below the oil quality threshold. Furthermore, such a method may comprise providing spark to the subset of deactivated cylinders at a predetermined position of one or more pistons coupled to the subset of deactivated cylinders, wherein providing spark may further be a function of pressure in the subset of deactivated cylinders, and wherein providing spark may serve to prevent fouling of one or more spark plugs configured to provide spark to the subset of deactivated cylinders. In one example, the predetermined position of the one or more pistons may include a position within a threshold number of degrees from a bottom dead center position.

Finally, in an example of the method, the engine may comprise a variable displacement engine. In such an example, reactivating the deactivated cylinder may further comprise reactivating the subset of deactivated cylinders including the deactivated cylinder which had the unintended combustion event, and deactivating the other cylinders of the engine operating to combust fuel.

In this way, spark plug fouling may be prevented in deactivated engine cylinders, and in the event that unintended combustion occurs in one of the deactivated engine cylinders, mitigating action may be undertaken to avoid a resulting torque bump.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
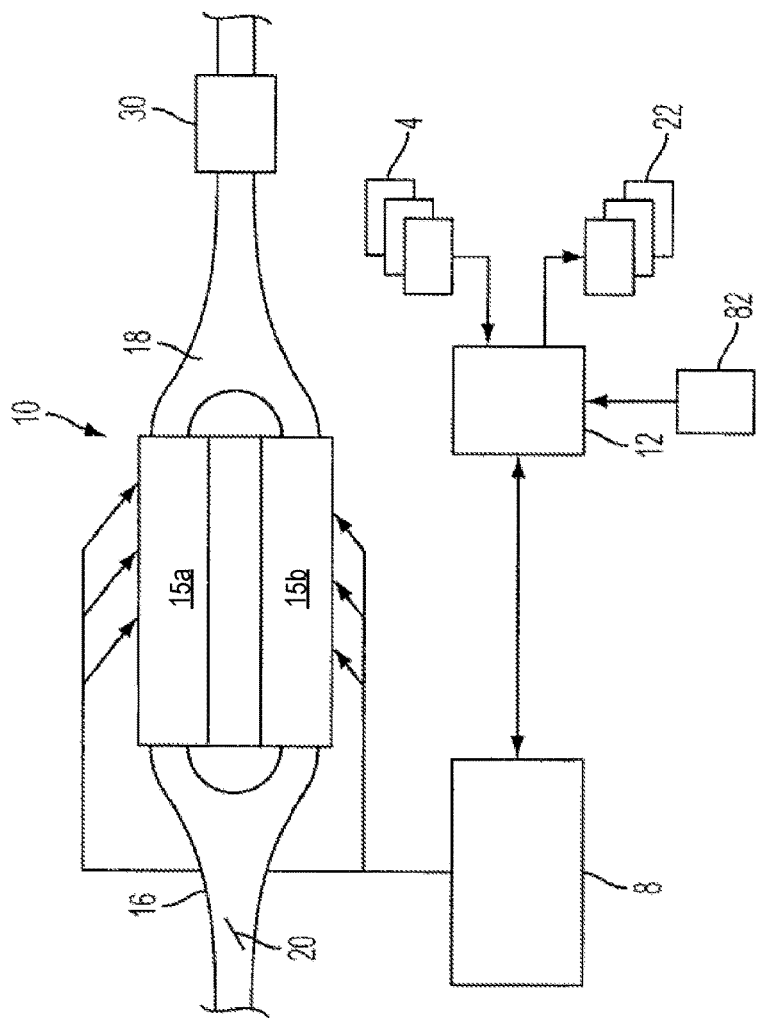
FIG. 1 schematically shows an example variable displacement engine system.
Figure 3A:
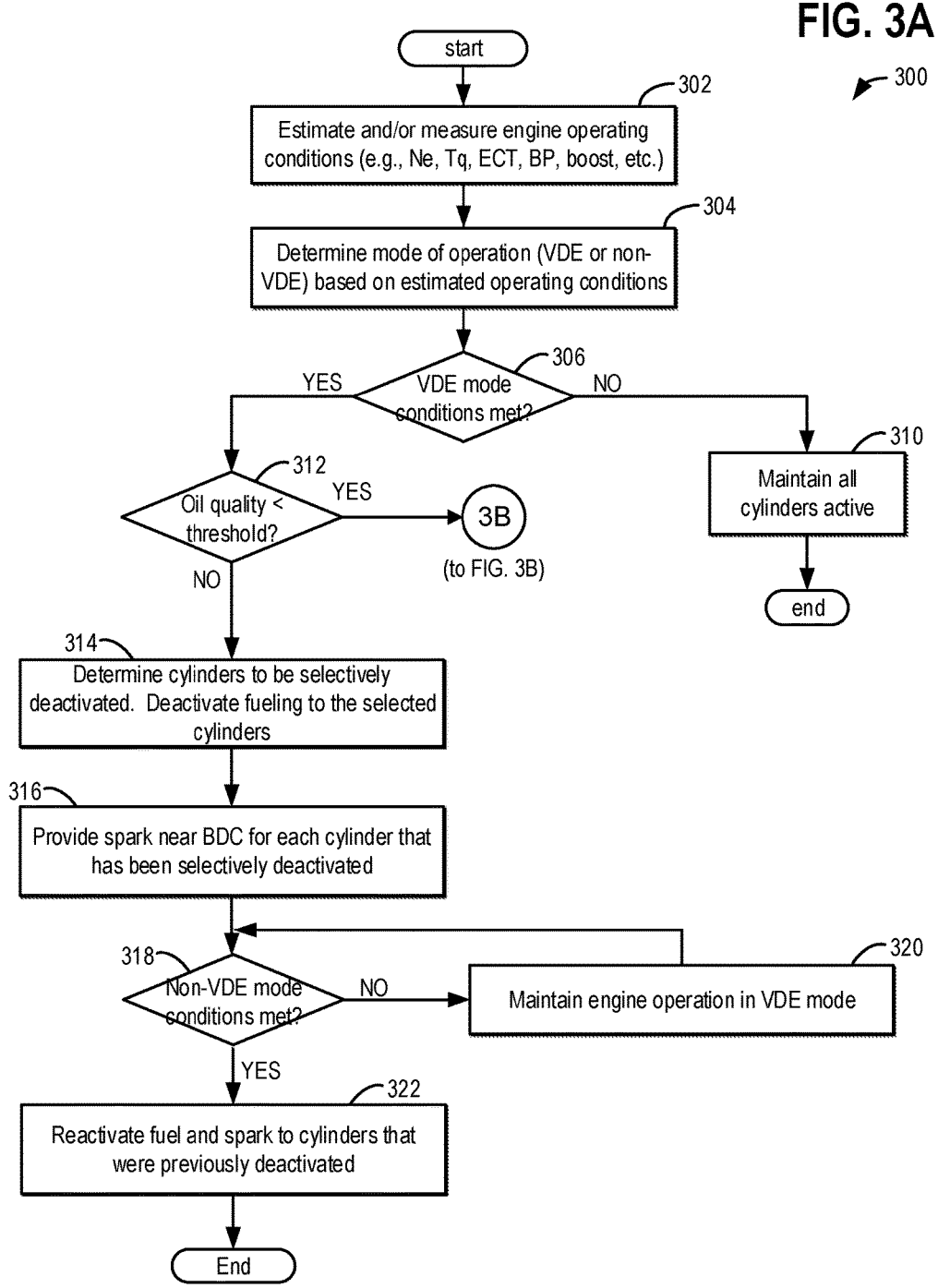
FIG. 3A shows an example method for selecting a cylinder deactivation strategy, and for conducting cylinder deactivation via trapping vacuum in a cylinder selected for deactivation.
Figure 3B:
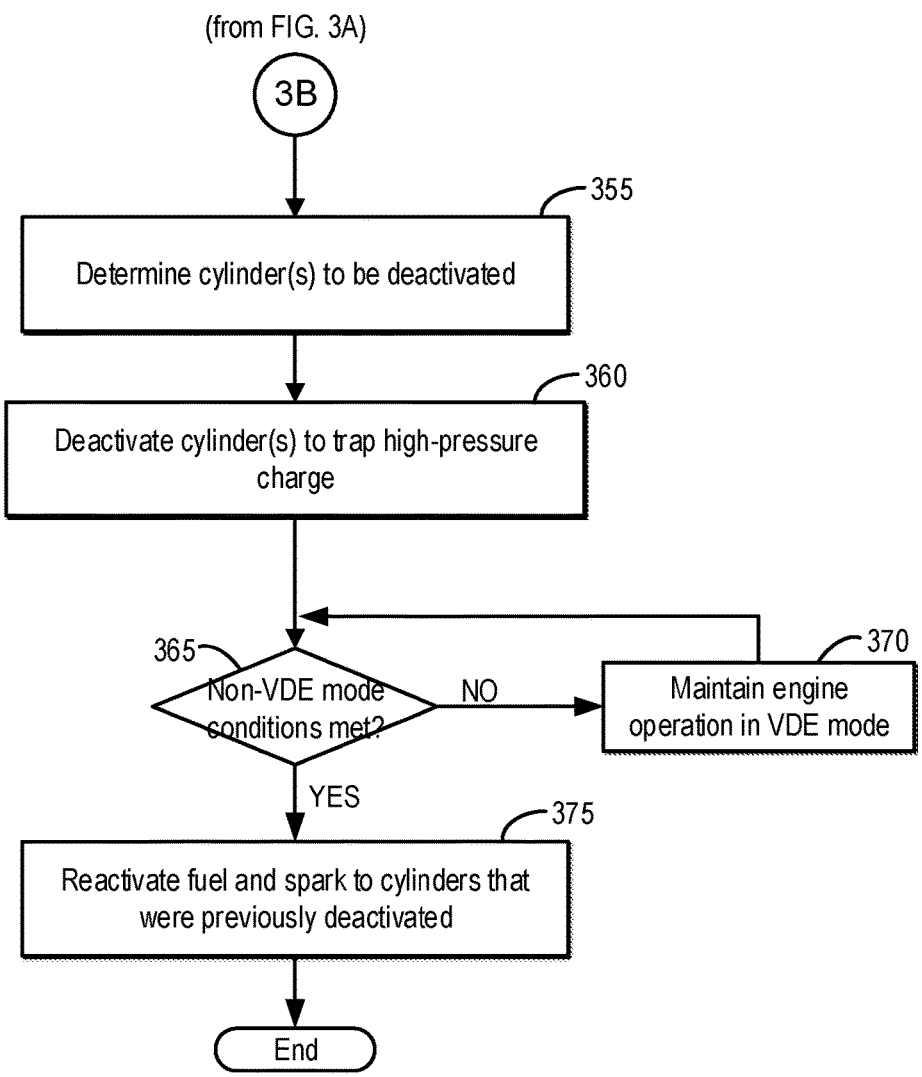
FIG. 3B shows an example method that continues from FIG. 3A, and includes conducting cylinder deactivation via trapping a high-pressure charge in a cylinder selected for deactivation.
Figure 4:
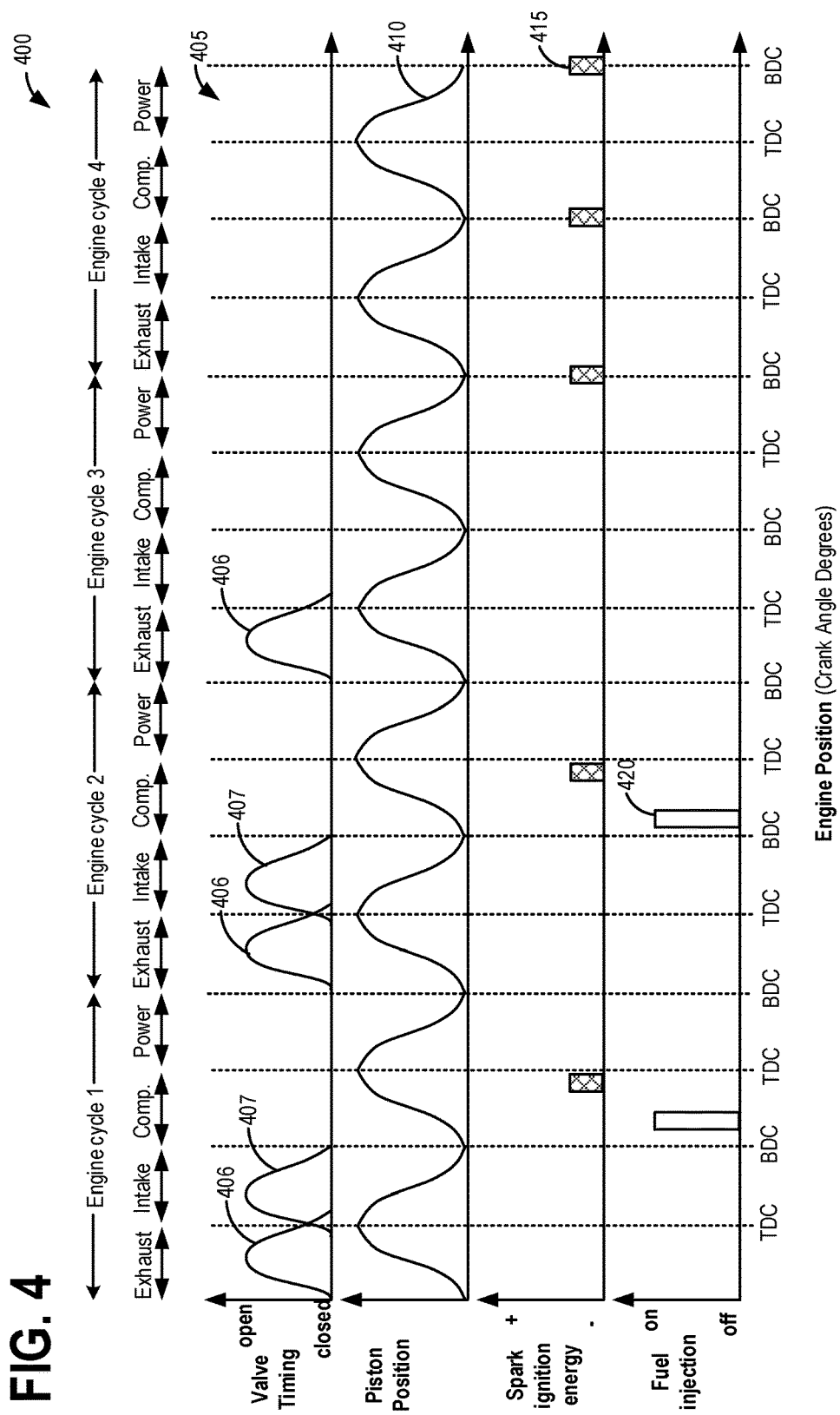
FIG. 4 shows an example map for deactivating an engine cylinder according to the method of FIG. 3A.
Figure 5:
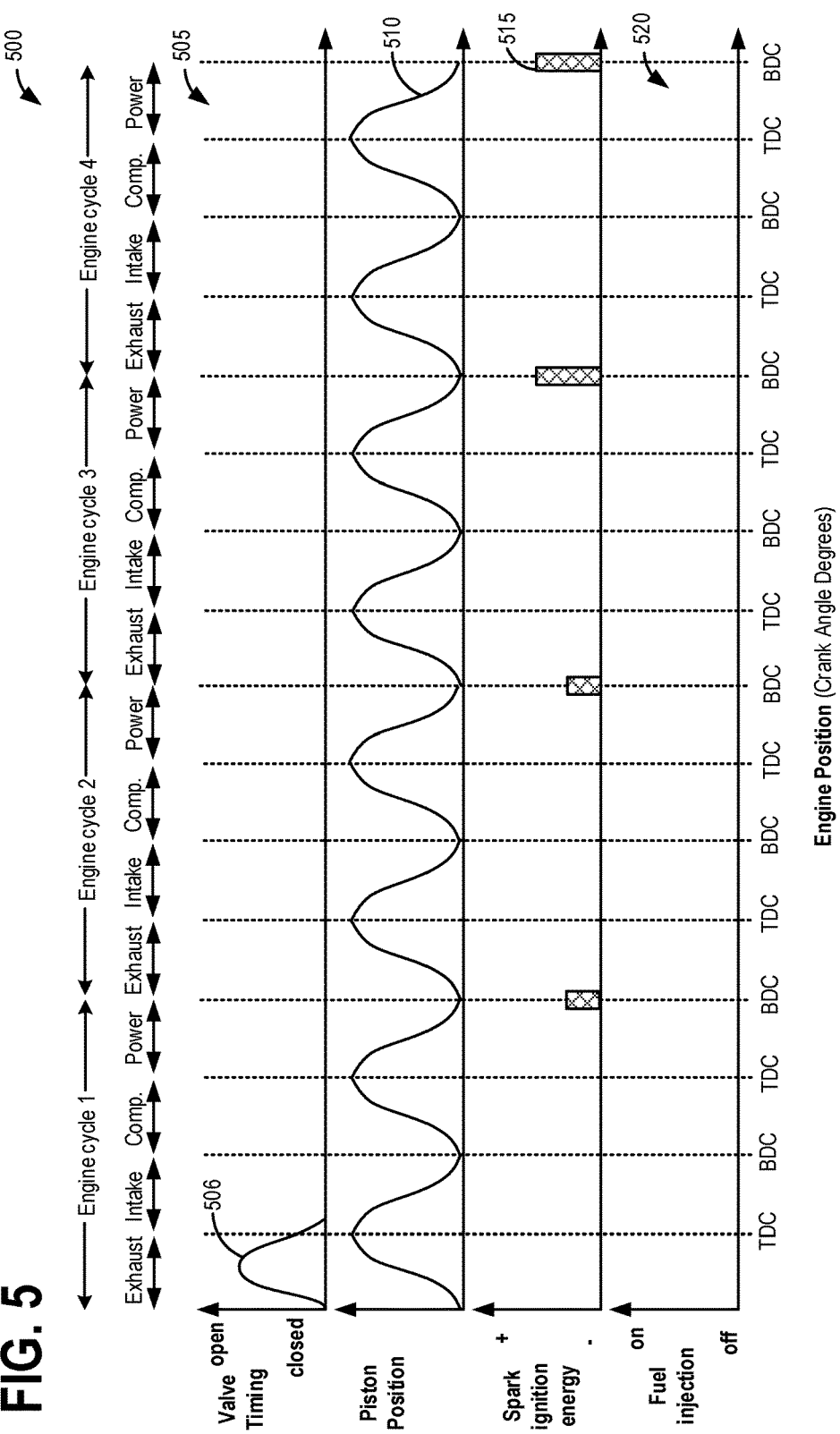
FIG. 5 shows another example map for deactivating an engine cylinder according to the method of FIG. 3A.
Figure 6:
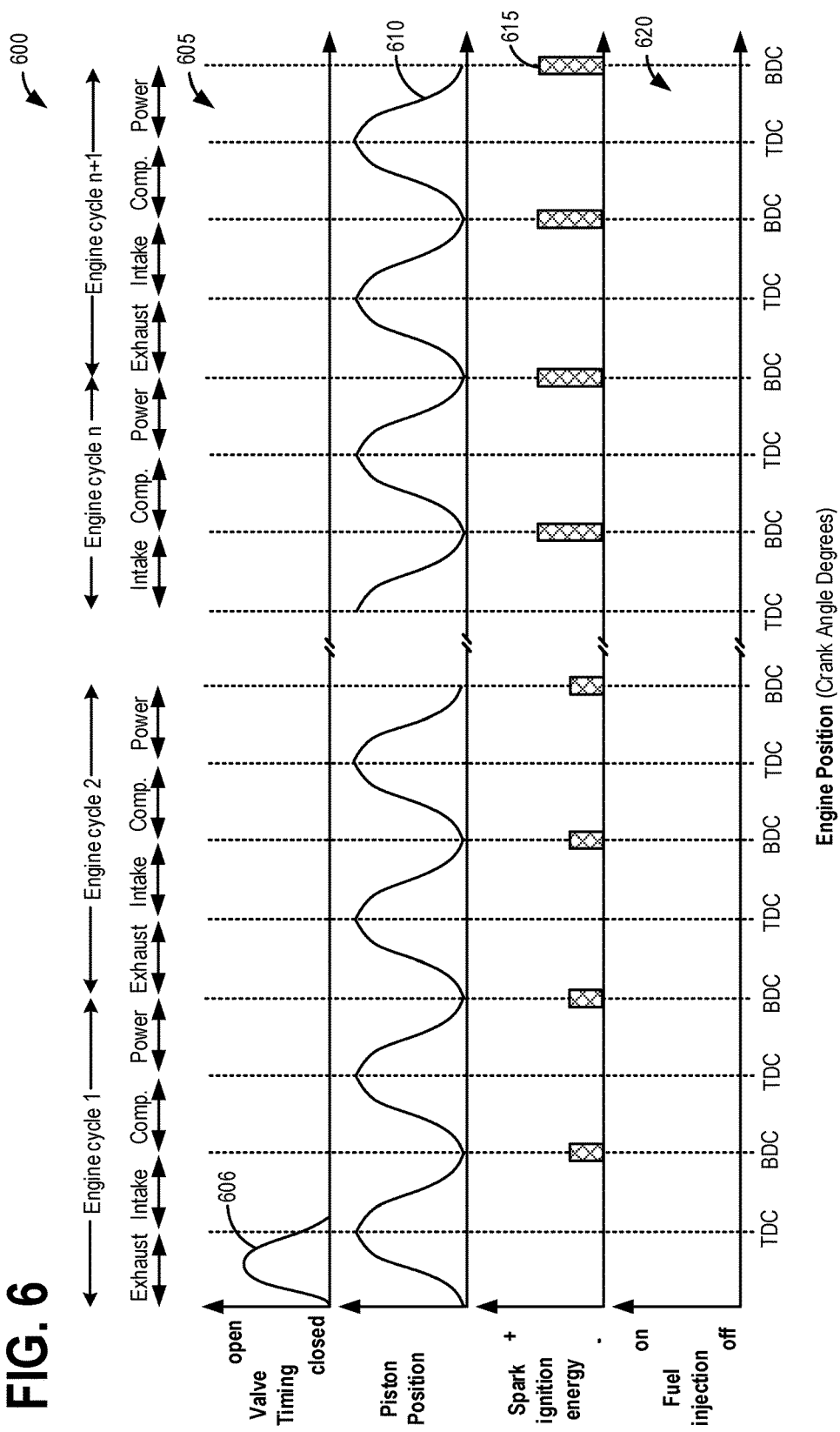
FIG. 6 shows another example map for deactivating an engine cylinder according to the method of FIG. 3A.
Figure 7:
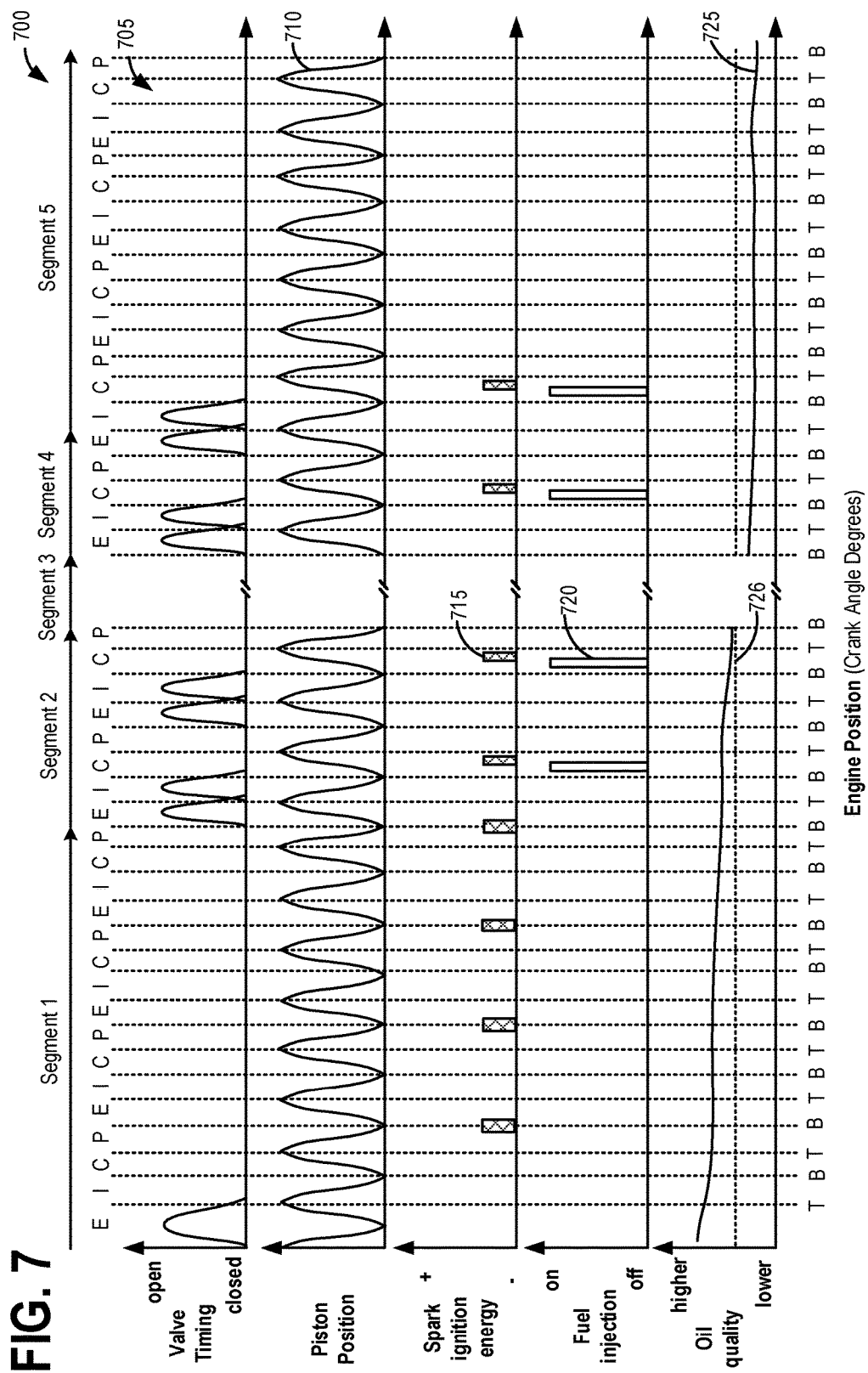
FIG. 7 shows an example map for selectively deactivating an engine cylinder according to the method of FIG. 3A and FIG. 3B, depending on an indicated oil quality.

The following description relates to systems and methods for reducing spark plug fouling in a vehicle with a variable displacement engine (VDE), such as the engine depicted at FIG. 1. Such an engine may be capable of selectively deactivating one or more engine cylinders, such as the engine cylinder depicted at FIG. 2. Two methods may be utilized to deactivate an engine cylinder in response to conditions being met for a cylinder deactivation event, or VDE event. In one example, a high-pressure charge may be trapped in a cylinder selected for deactivation. Trapping a high-pressure charge may reduce oil migration to the cylinder while the cylinder is deactivated, thus preventing spark plug fouling. However, such an approach may result in an undesirable torque bump at deactivation. Furthermore, such an approach may result in a pumping penalty, which may be significant if the cylinder is deactivated and reactivated often. In another example, a vacuum may be trapped in the cylinder selected for deactivation. Trapping a vacuum may reduce or avoid the torque bump that would otherwise be present at deactivation (if a high-pressure charge were trapped in the selected cylinder). However by trapping a vacuum, oil migration to the selected cylinder may increase. Such increased oil migration may result in spark plug fouling in some situations. To prevent such spark plug fouling, spark may be provided to a deactivated cylinder or cylinders with trapped vacuum, where the spark is provided when a piston coupled to the cylinder is near bottom dead center (BDC) (e.g. within a threshold percentage of degrees from BDC). Accordingly, FIG. 3A depicts a method where it may be determined whether to conduct a cylinder deactivation via trapping vacuum, or trapping high-pressure charge. Such a determination may be a function of an indicated oil quality, for example. FIG. 3A further depicts controlling spark during the cylinder deactivation, provided the cylinder is deactivated with a vacuum trapped in the cylinder. Alternatively, if it is indicated at FIG. 3A that it is preferable to conduct deactivation of the cylinder via trapping the high-pressure charge, FIG. 3B depicts such a method. FIG. 4 depicts a map where spark is provided to a cylinder near BDC at every occasion (e.g. twice per engine cycle) the piston coupled to the cylinder is near BDC. Alternatively, FIG. 5 depicts a map where spark is provided to a cylinder near BDC at every other occasion (e.g. once per engine cycle) the piston is near BDC. Furthermore, FIG. 5 depicts an example where, after two spark events when the piston is near BDC, where the two spark events comprise a basal spark ignition energy, spark energy is increased for each subsequent spark event. FIG. 6 shows yet another map where spark is provided to a deactivated cylinder at every occasion a piston coupled to the deactivated cylinder is near BDC, where the basal spark ignition energy is provided for a predetermined number of engine cycles or spark events, and where after the predetermined number of engine cycles (or spark events) elapses, then spark ignition energy is increased for the remainder of the time the cylinder is deactivated. FIG. 7 depicts still another map where a cylinder is deactivated first by trapping a vacuum in the cylinder, and where spark is provided near BDC while the cylinder is deactivated to prevent spark plug fouling, and then at a later time in the same drive cycle, the cylinder is deactivated by trapping a high-pressure charge in the cylinder. Determining whether to deactivate the cylinder by trapping a vacuum, or trapping a high-pressure charge, may be based on a quality of engine oil, for example.

Figure 9:
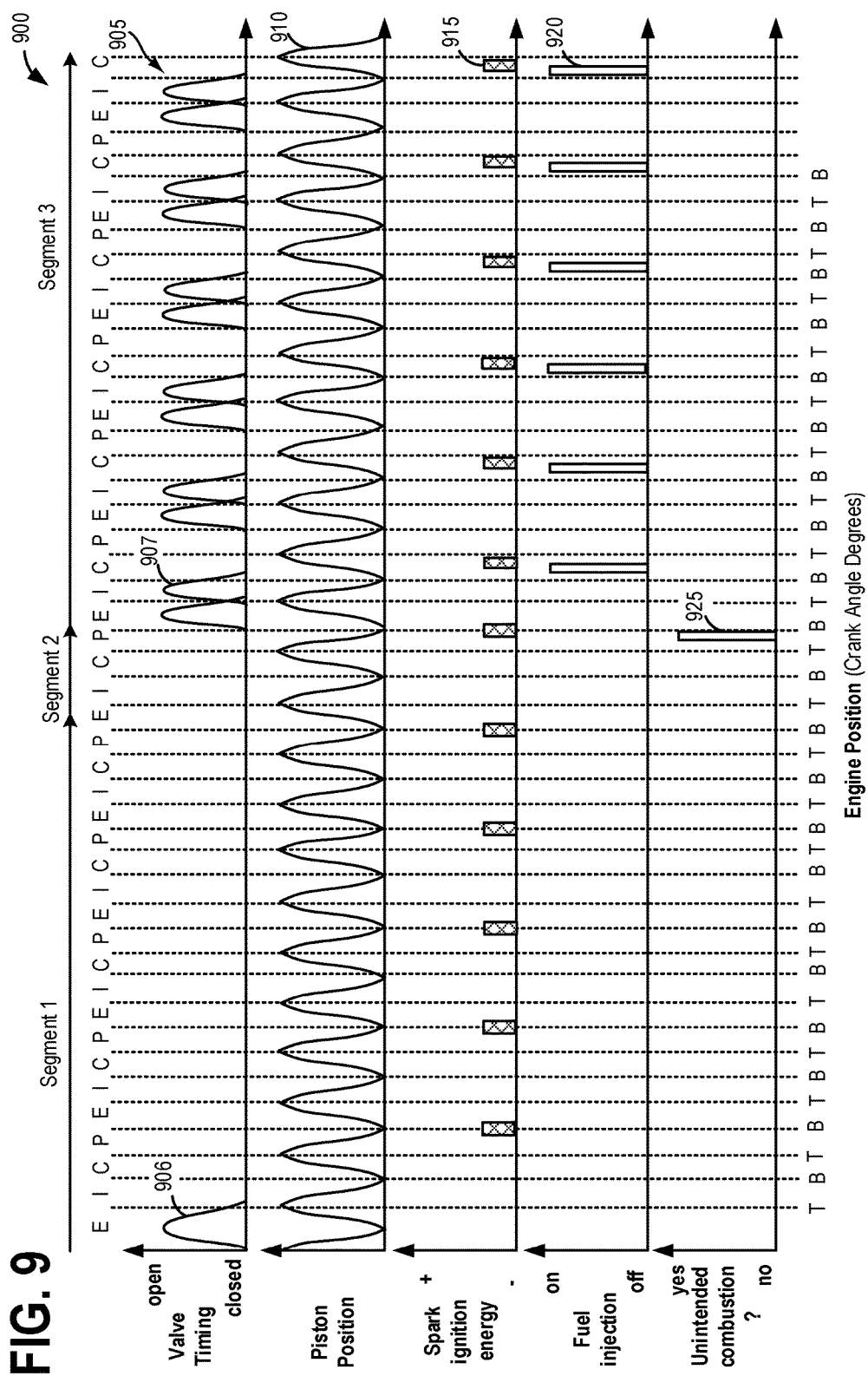
FIG. 9 depicts an example map for reactivating a deactivated cylinder in response to an indication of unintended combustion in the deactivated cylinder.
Figure 10:
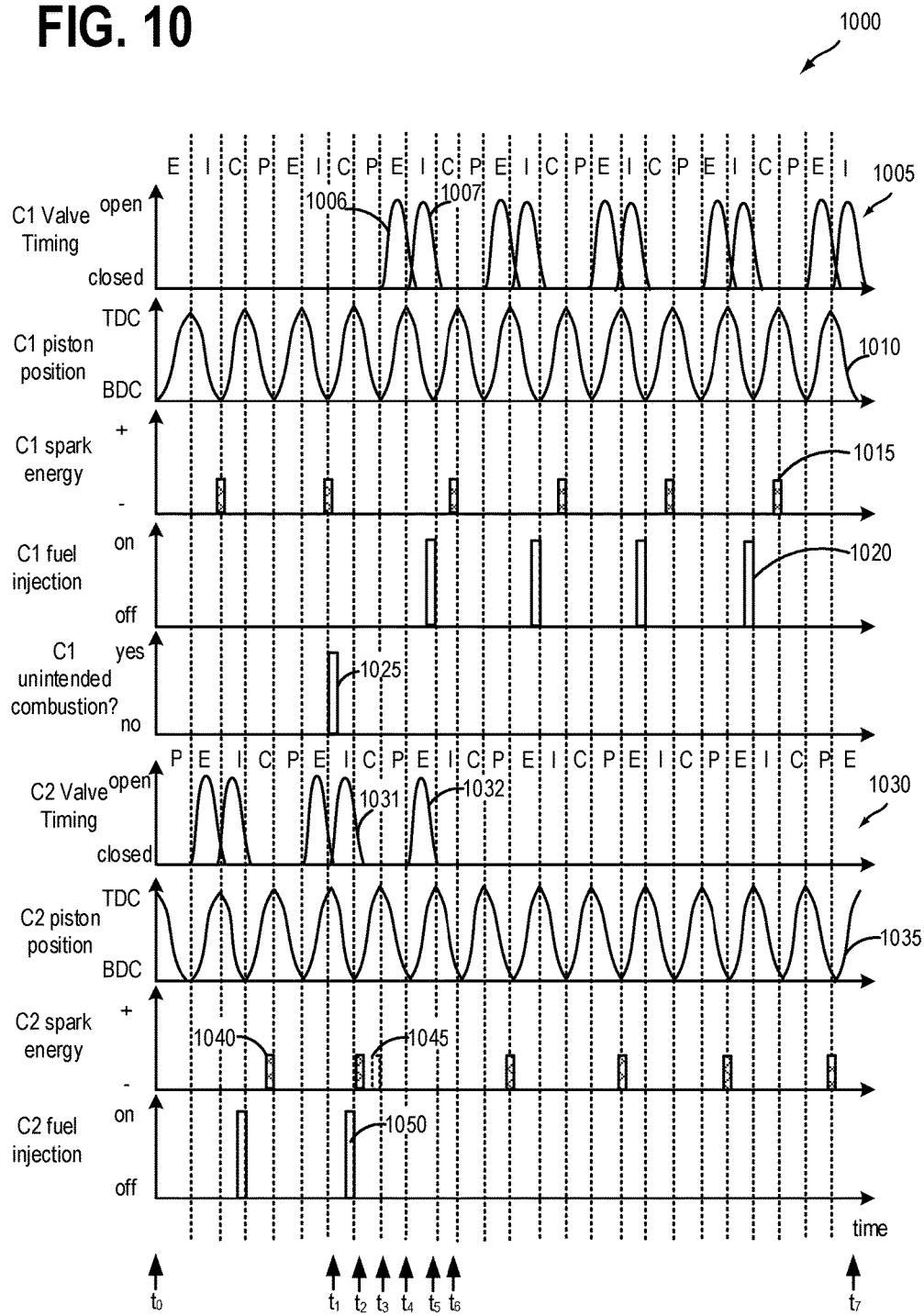
FIG. 10 depicts an example timeline for reducing or avoiding a torque bump resulting from unintended combustion in a deactivated cylinder, and for reassigning activated/deactivated cylinders subsequent to the unintended combustion event.

By providing spark to deactivated cylinder(s) near BDC, unintended combustion events may be reduced for deactivated cylinders. However, it is herein recognized that such unintended combustion events may, in some examples and under some circumstances, still occur. Accordingly, turning to FIG. 8A, it depicts an example methodology for reducing or avoiding a torque bump resulting from unintended combustion in a deactivated cylinder, when the cylinder is deactivated via trapping negative pressure with respect to atmospheric pressure in the cylinder. FIG. 8B depicts similar methodology under conditions where a positive pressure with respect to atmospheric pressure is trapped in the cylinder. FIG. 9 depicts an example map for reactivating a deactivated cylinder in response to such an unintended combustion event. FIG. 10 depicts an example timeline for mitigating a torque bump resulting from the unintended combustion event, and for reassigning deactivated cylinders to be reactivated while reassigning activated cylinders to be deactivated, responsive to an unintended combustion event while the engine is operating in a variable displacement engine mode (VDE mode).

FIG. 1 shows an example variable displacement engine (VDE) 10 having a first bank 15a and a second bank 15b. In the depicted example, engine 10 is a V6 engine with the first and second banks each having three cylinders. However, in alternate embodiments, the engine may have a different number of engine cylinders, such as 4, 8, 10, 12, etc. Engine 10 has an intake manifold 16, with throttle 20, and an exhaust manifold 18 coupled to an emission control system 30. Emission control system 30 includes one or more catalysts and air-fuel ratio sensors, such as described with regard to FIG. 2. As one non-limiting example, engine 10 can be included as part of a propulsion system for a passenger vehicle.

During selected conditions, such as when the full torque capability of the engine is not needed, one or more cylinders, such as one of a first or second cylinder group, may be selected for deactivation (herein also referred to as a VDE mode of operation). Specifically, one or more cylinders may be deactivated by shutting off respective fuel injectors while commanding intake and exhaust valves closed. While fuel injectors of the disabled cylinders are turned off, the remaining enabled cylinders continue to carry out combustion with fuel injectors active and operating. To meet torque requirements, the engine may produce the same amount of torque on those cylinders for which the injectors remain enabled. This may require higher manifold pressures, resulting in lowered pumping losses and increased engine efficiency. Also, the lower effective surface area (from only the enabled cylinders) exposed to combustion reduces engine heat losses, improving the thermal efficiency of the engine. In alternate examples, engine system 10 may have cylinders with selectively deactivatable intake and/or exhaust valves wherein deactivating the cylinder includes deactivating the intake and/or exhaust valves.

Cylinders may be grouped for deactivation in a bank-specific manner. For example, in FIG. 1, the first group of cylinders may include the three cylinders of the first bank 15a while the second group of cylinders may include the three cylinders of the second bank 15b. In an alternate example, instead of one or more cylinders from each bank being deactivated together, two cylinders from each bank of the V6 engine may be selectively deactivated together. In still another example, only one cylinder may be deactivated.

Engine 10 may operate on a plurality of substances, which may be delivered via fuel system 8. Engine 10 may be controlled at least partially by a control system including controller 12. Controller 12 may receive various signals from sensors 4 coupled to engine 10, and send control signals to various actuators 22 coupled to the engine and/or vehicle.

Fuel system 8 may be further coupled to a fuel vapor recovery system (not shown) including one or more canisters for storing refueling and diurnal fuel vapors. During selected conditions, one or more valves of the fuel vapor recovery system may be adjusted to purge the stored fuel vapors to the engine intake manifold to improve fuel economy and reduce exhaust emissions. In one example, the purge vapors may be directed near the intake valve of specific cylinders. For example, during a VDE mode of operation, purge vapors may be directed only to the cylinders that are firing. This may be achieved in engines configured with distinct intake manifolds for distinct groups of cylinders. Alternatively, one or more vapor management valves may be controlled to determine which cylinder gets the purge vapors.

Controller 12 may receive an indication of cylinder knock or pre-ignition from one or more knock sensors 82 distributed along the engine block. When included, the plurality of knock sensors may be distributed symmetrically or asymmetrically along the engine block. As such, the one or more knock sensors 82 may be accelerometers, or ionization sensors. Further details of the engine 10 and an example cylinder are described with regard to FIG. 2.

Figure 2:
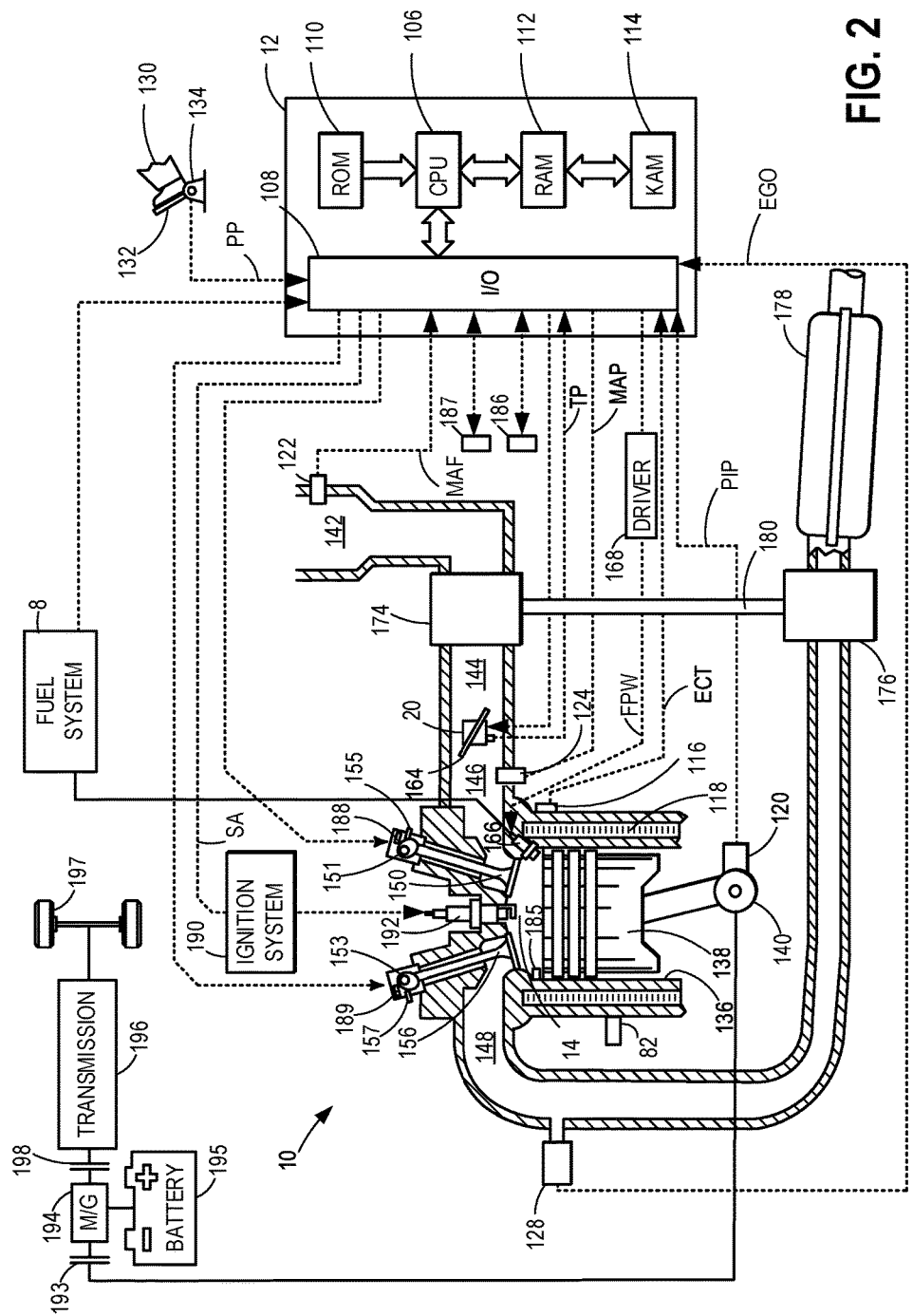
FIG. 2 shows a partial engine view.

FIG. 2 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel (for example) to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 2, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Cam actuation system 151 may include first camshaft sensor(s) 188. Similarly, exhaust valve 156 may be controlled by controller 12 via cam actuation system 153. Cam actuation system 153 may include second camshaft sensor(s) 189. In some examples, one or more of first camshaft sensor 188 and second camshaft sensor 189 may be utilized to determine piston location, for example whether the piston is at top dead center or bottom dead center, or somewhere in between. In some examples, such a determination may be provided in conjunction with data received via the controller from crankshaft position sensor 120. It may be understood that in FIG. 2, a camshaft is not shown, but engine 10 may include a camshaft. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems, or may additionally include the exhaust valve controlled via electric valve actuation. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

It will also be appreciated that while the depicted embodiment illustrates the engine being operated by injecting fuel via a single direct injector; in alternate embodiments, the engine may be operated by using two or more injectors (for example, a direct injector and a port injector, two direct injectors, or two port injectors) and varying a relative amount of injection from each injector.

Fuel may be delivered by the injector to the cylinder during a single cycle of the cylinder. Further, the distribution and/or relative amount of fuel delivered from the injector may vary with operating conditions. Furthermore, for a single combustion event, multiple injections of the delivered fuel may be performed per cycle. The multiple injections may be performed during the compression stroke, intake stroke, or any appropriate combination thereof. Also, fuel may be injected during the cycle to adjust the air-to-injected fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as EGO sensor 128. By measuring an amount of residual oxygen in the exhaust gas, the sensor may determine the AFR. As such, the AFR may be provided as a Lambda (λ) value, that is, as a ratio of actual AFR to stoichiometry for a given mixture. Thus, a Lambda of 1.0 indicates a stoichiometric mixture, richer than stoichiometry mixtures may have a lambda value less than 1.0, and leaner than stoichiometry mixtures may have a lambda value greater than 1.

As described above, FIG. 2 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, and/or combinations thereof etc.

Engine 10 may further include a knock sensor 82 coupled to each cylinder 14 for identifying abnormal cylinder combustion events. In alternate embodiments, one or more knock sensors 82 may be coupled to selected locations of the engine block. The knock sensor may be an accelerometer on the cylinder block, or an ionization sensor configured in the spark plug of each cylinder. The output of the knock sensor may be combined with the output of a crankshaft acceleration sensor to indicate an abnormal combustion event in the cylinder. In one example, based on the output of knock sensor 82 in one or more defined windows (e.g., crank angle timing windows), abnormal combustion due to one or more of knock and pre-ignition may be detected and differentiated. As an example, pre-ignition may be indicated in response to knock sensor signals that are generated in an earlier window (e.g., before a cylinder spark event) while knock may be indicated in response to knock sensor signals that are generated in a later window (e.g., after the cylinder spark event). Further, pre-ignition may be indicated in response to knock sensor output signals that are larger (e.g., higher than a first threshold), and/or less frequent while knock may be indicated in response to knock sensor output signals that are smaller (e.g., higher than a second threshold, the second threshold lower than the first threshold) and/or more frequent.

In addition, a mitigating action applied may be adjusted based on whether the abnormal combustion was due to knock or pre-ignition. For example, knock may be addressed using spark retard and EGR while pre-ignition is addressed using cylinder enrichment, cylinder enleanment, engine load limiting, and/or delivery of cooled external EGR.

One or more of fuel injector 166, intake valve 150, and exhaust valve 156 may be selectively deactivatable. As discussed at FIG. 1, during conditions when the full torque capability of the engine is not needed, such as low load conditions, cylinder 14 may be selectively deactivated by disabling cylinder fueling and/or the operation of the cylinder's intake and exhaust valves. As such, remaining cylinders that are not deactivated may continue to operate and the engine may continue to spin. As discussed above, one method of deactivating a cylinder may include trapping a high-pressure charge in the cylinder, which may prevent oil migration into the cylinder, but which may result in a noticeable torque bump at the time of deactivation, as well as a pumping penalty for the first event after deactivation. Another method of cylinder deactivation may include trapping a vacuum in the cylinder. Such a method may reduce the torque bump at deactivation, and may increase fuel efficiency when one or more cylinders are deactivated and activated often, due to lower pumping work. A disadvantage to trapping a vacuum in the deactivated cylinder is that oil consumption may increase, which may lead to oil fouled spark plug(s). Furthermore, the vacuum condition may result in oil and/or crankcase vapors from migrating into deactivated cylinder(s), which may result in unintended combustion events. To address such issues of spark plug fouling, increased oil consumption and/or undesired/unintended combustion events, the inventors herein have developed methods to address them. Such methodology is described in detail below at FIGS. 3A-3B. Briefly, the methodology described herein may enable the trapping of vacuum in the deactivated cylinder(s), which may in turn reduce the torque bump at deactivation. The methodology may include continuing to provide spark to deactivated engine cylinder(s), but where spark is provided when the piston(s) (e.g. 138) coupled to the deactivated cylinder(s) are at or near (e.g. within a predetermined number of degrees) bottom dead center (BDC). By providing spark near BDC, the methodology described herein may reduce or eliminate undesired combustion events, and may reduce or eliminate spark plug fouling. More specifically, by continuing to spark, oil residue may be prevented from fouling the spark plug. Furthermore, by sparking at BDC, unintended combustion events may be reduced or eliminated due to the large cylinder volume at BDC.

Accordingly, discussed herein, BDC may refer to a position of the piston (e.g. 138), which is nearest to the crankshaft (e.g. 140), and top dead center (TDC) may refer to a position of the piston farthest from the crankshaft. For example, it may be understood that BDC is 180° from TDC. By defining BDC in relation to TDC as such, the predetermined number of degrees from BDC may readily be determined via the controller (e.g. 12) based on one or more of a camshaft position and/or crankshaft position.

Controller 12 is shown as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; engine oil temperature from temperature sensor 187; oil quality from oil quality sensor 186; a profile ignition pickup signal (PIP) from Hall effect sensor 120 (or other type) (also referred to herein as crankshaft position sensor) coupled to crankshaft 140; throttle position (TP) from a throttle position sensor; absolute manifold pressure signal (MAP) from sensor 124, cylinder AFR from EGO sensor 128, and abnormal combustion from knock sensor 82 and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

In some examples, engine 10 may include an oil life indicator, or oil quality sensor 186. Oil quality sensor 186 may comprise one or more sensors that may measure conductivity of oil, mechanical properties of the oil, soot concentration in the oil, presence and/or amount of water in the oil, etc. For example, measurement of conductivity may include how easily electric current passes through the oil, to enable a determination as to abundance of contaminants in the oil (e.g. lower the resistance, the more contaminants).

Measurement of mechanical properties may include a piezoelectric sensor, which may enable determination of how thick the oil is.

In some examples, oil quality sensor 186 may be utilized to determine what approach to take (e.g. trapping a high-pressure charge or trapping a negative pressure with respect to atmosphere) to deactivate one or more engine cylinder(s), as will be discussed in further detail below.

In some examples, engine 10 may further include an in-cylinder pressure sensor 185. In-cylinder pressure sensor may be configured to send data related to pressure in the cylinder, to the controller.

Storage medium read-only memory 110 can be programmed with computer readable data representing instructions executable by processor 106 for performing the methods described below as well as other variants that are anticipated but not specifically listed. Example routines are shown with reference to FIGS. 3A-3B.

In some examples, engine 10 may be included in a hybrid vehicle with multiple sources of torque available to one or more vehicle wheels 197. In other examples, engine 10 may be included in a conventional vehicle with only an engine. In the example shown, the vehicle includes engine 10 and an electric machine 194. Electric machine 194 may be a motor or a motor/generator. Crankshaft 140 of engine 10 and electric machine 194 are connected via a transmission 196 to vehicle wheels 197 when one or more clutches are engaged. In the depicted example, a first clutch 193 is provided between crankshaft 140 and electric machine 194, and a second clutch 198 is provided between electric machine 194 and transmission 196. Controller 12 may send a signal to an actuator (not shown) of each clutch (e.g. 193, 198) to engage or disengage the clutch(s), so as to connect or disconnect crankshaft 140 from electric machine 194 and the components connected thereto, and/or connect or disconnect electric machine 194 from transmission 196 and the components connected thereto. Transmission 196 may be a gearbox, a planetary gear system, or another type of transmission. The powertrain may be configured in various manners including as a parallel, a series, or a series-parallel hybrid vehicle.

Electric machine 194 receives electrical power from a traction battery 195 to provide torque to vehicle wheels 197. Electric machine 194 may also be operated as a generator to provide electrical power to charge battery 195, for example during a braking operation.

Thus, a system for a vehicle may comprise a variable displacement engine, including a set of cylinders and where each cylinder is coupled to a fuel injector and a spark plug, and where each cylinder includes a piston. The system may further include a controller, storing instructions in non-transitory memory that, when executed, cause the controller to, in response to conditions being met for deactivating a cylinder or a plurality of cylinders from the set of cylinders, determining whether to deactivate the cylinder or the plurality of cylinders by trapping a vacuum in the cylinder or the plurality of cylinders, or to deactivate the cylinder or the plurality of cylinders by trapping a high-pressure charge in the cylinder or the plurality of cylinders. In response to trapping the vacuum in the cylinder or the plurality of cylinders, the controller may provide spark when the piston or pistons in the cylinder or the plurality of cylinders are within a threshold of bottom dead center, but may not provide fuel to the cylinder or the plurality of cylinders while the cylinder or the plurality of cylinders are deactivated. Alternatively, responsive to trapping the high-pressure charge in the cylinder or the plurality of cylinders, the controller may discontinue providing both spark and fuel to the cylinder or the plurality of cylinders.

Such a system may further comprise a crankshaft coupled to the variable displacement engine, a crankshaft position sensor, a camshaft coupled to the variable displacement engine, and a camshaft position sensor. The controller may store further instructions to indicate, via one or more of the crankshaft sensor and/or the camshaft sensor, whether a piston or pistons of the cylinder or the plurality of the cylinders, respectively, are within the threshold of bottom dead center, where the threshold of bottom dead center comprises a predetermined number of degrees from the bottom dead center position while the cylinder or the plurality of cylinders are deactivated via trapping the vacuum, and where responsive to the piston or pistons being within the threshold of bottom dead center position, providing spark via the spark plug.

Such a system may further comprise an oil quality sensor. In such an example, the controller may store further instructions to determine to deactivate the cylinder or the plurality of cylinders by trapping the vacuum in response to an indication that an oil quality is greater than an oil quality threshold, and to deactivate the cylinder or the plurality of cylinders by trapping the high-pressure charge in response to an indication that the oil quality is lower than the oil quality threshold.

Another example of a system for a vehicle may comprise a variable displacement engine, including a set of cylinders and where each cylinder is coupled to a fuel injector and a spark plug, and where each cylinder includes a piston, a crankshaft mechanically coupled to the variable displacement engine, and a crankshaft position sensor. Such a system may further comprise a controller, storing instructions in non-transitory memory that, when executed, cause the controller to deactivate a first subset of cylinders that includes one or more cylinders from the set of cylinders in response to predetermined conditions being met, where deactivating the first subset of cylinders includes at least sealing and stopping providing fuel injection to the first subset of cylinders. The controller may store further instructions to maintain a second subset of cylinders that includes one or more cylinders from the set of cylinders activated to combust air and fuel, and to monitor acceleration of the crankshaft while the first subset of cylinders is deactivated. In response to acceleration of the crankshaft greater than a crankshaft acceleration threshold, the controller may store further instructions to retard a spark provided to an activated cylinder included in the second subset of cylinders, the activated cylinder comprising a cylinder scheduled to combust air and fuel immediately following the acceleration of the crankshaft greater than the crankshaft acceleration threshold. The controller may store further instructions to assign the first subset of cylinders to be reactivated to combust air and fuel and the second subset of cylinders to be deactivated, immediately following retarding the spark provided to the activated cylinder.

In such a system, acceleration of the crankshaft greater than the crankshaft acceleration threshold is a result of an unintended combustion in a deactivated cylinder included in the first subset of cylinders. In such an example, the controller may store further instructions to exhaust residual burnt gas in the deactivated cylinder resulting from the unintended combustion prior to reactivating the first subset of cylinders including the deactivated cylinder.

In another example of such a system, the controller may store further instructions to provide spark to the first subset of cylinders while the first subset is deactivated, and to provide spark to the second subset of cylinders while the second subset is deactivated, where providing spark includes providing spark when pistons coupled to cylinders included in the first subset and/or the second subset are at predetermined positions in relation to the crankshaft.

Yet another example of such a system may further comprise an oil quality sensor. In such an example, the controller may store further instructions to deactivate the first subset and/or the second subset of cylinders by trapping a negative pressure with respect to atmospheric pressure in the first subset and/or second subset of cylinders in response to an indication that an oil quality of an oil utilized for cooling, lubrication and/or cleaning of the variable displacement engine is greater than an oil quality threshold, and to deactivate the first subset and/or the second subset of cylinders by trapping a positive pressure with respect to atmospheric pressure in the first subset and/or the second subset of cylinders in response to an indication that the oil quality is below the oil quality threshold.

Turning now to FIG. 3A, a flowchart for a high-level example method 300 is shown for reducing unintended/undesired combustion events and preventing spark plug fouling in response to deactivation of one or more engine cylinders. Method 300 will be described in reference to the systems described in FIGS. 1-2, though it should be understood that method 300 may be applied to other systems without departing from the scope of this disclosure. Method 300 may be carried out by a controller, such as controller 12, and may be stored as executable instructions in non-transitory memory. Instructions for carrying out method 300 and the rest of the methods included herein may be executed by the controller based on instructions stored on a memory of the controller and in conjunction with signals received from sensors of the vehicle system, such as the sensors described above with reference to FIGS. 1-2. The controller may employ engine system actuators such as spark plug(s) (e.g. 192), fuel injector(s) (e.g. 166), etc., according to the methods depicted below.

Method 300 begins at 302, and may include estimating and/or measuring engine operating conditions. These may include, for example, engine speed, desired torque (for example, from a pedal-position sensor), manifold pressure (MAP), manifold air flow (MAF), BP, engine temperature, catalyst temperature, intake temperature, spark timing, air temperature, knock limits, etc.

Proceeding to 304, method 300 may include determining, based on the estimated operating conditions, an engine mode of operation (e.g., VDE or non-VDE). For example, if the torque demand is low, the controller may determine that one or more cylinders can be deactivated while the torque demand is met by the remaining active cylinders. In comparison, if the torque demand is high, the controller may determine that all the cylinders need to remain active.

Proceeding to 306, method 300 may include confirming whether VDE mode conditions (e.g. cylinder deactivation conditions) are met. In one example, cylinder deactivation conditions may be confirmed when torque demand is less than a threshold. If cylinder deactivation conditions are confirmed, a VDE mode is selected. If cylinder deactivation conditions are not confirmed, at 310, the routine includes maintaining all the cylinders active and combusting.

If cylinder deactivation conditions and a VDE mode of operation are confirmed, then method 300 may proceed to 312. At 312, method 300 may include determining a quality of oil included in the engine for lubrication, cleaning, and cooling of various engine components. In one example, the oil is engine oil, or motor oil. Determining a quality of oil at 312 may include determining whether the quality of the oil is above an oil quality threshold, or below the oil quality threshold, where oil quality above the threshold indicates higher (e.g. better) quality oil, and where oil quality below the threshold indicates lower (e.g. lesser) quality oil. Higher, or better, quality oil may comprise oil which is more effective at lubricating, cleaning, and/or drawing heat from the engine, whereas lower quality, or lesser quality oil may comprise oil which is less effective at lubricating, cleaning, and/or drawing heat from the engine. In one example, oil quality above the threshold may include oil which, if spark is continued to be provided to a deactivated cylinder during a VDE event, may prevent fouling of the spark plug. In other words, migration of oil into the deactivated engine cylinder (with vacuum trapped in the cylinder) may not foul the spark plug, as long as spark is provided (near BDC) while the cylinder is deactivated. Alternatively, oil quality below the threshold may comprise oil quality where, if migration of oil were to occur while a cylinder is deactivated (with vacuum in the cylinder), even if spark is provided during the deactivation, the spark plug may still be susceptible to fouling.

In some examples, the oil quality threshold may be adjusted as a function of vehicle operating conditions, such as vehicle speed, engine speed, engine load, engine temperature, oil temperature, etc. For example, depending on the various vehicle operation conditions, it may be indicated how susceptible to oil migration a deactivated cylinder may be, under situations where vacuum is trapped in the cylinder upon deactivation. For example, lower engine speeds, lower vehicle speeds, lower engine loads, etc., may result in less oil migration to a deactivated cylinder with trapped vacuum, than higher engine speeds, higher vehicle speeds, higher engine loads, etc. Thus, the oil quality threshold may be adjusted as a function of how susceptible to oil migration one or more deactivated cylinders may be, where such susceptibility is based on the above-mentioned vehicle operating parameters. As one example, consider a situation where oil quality is low, but where vehicle operating conditions are such that oil migration into a deactivated cylinder (with trapped vacuum) is less likely. Such conditions may include lower engine speeds, lower engine loads, etc. In such an example, the threshold may be adjusted such that the threshold is lowered. In another example, the threshold may be raised, responsive to vehicle operating conditions being such that oil migration into a deactivated cylinder (with trapped vacuum) is more likely.

Accordingly, at 312, if oil quality is indicated to be below the threshold, method 300 may proceed to FIG. 3B, where deactivation of the one or more engine cylinder(s) may be conducted such that a high-energy charge is trapped in the cylinder(s), which may reduce the potential for spark plug fouling, by reducing/preventing oil migration into the cylinder(s). However, a disadvantage to such a method may be a torque bump present at deactivation. Thus, when possible, it may be desirable to deactivate the cylinder(s) by trapping a vacuum rather than a high-pressure charge. In any event, a method for trapping the high-pressure charge at deactivation will be discussed in detail below at FIG. 3B.

Alternatively, at 312, in response to an indication that oil quality is greater than the oil quality threshold, method 300 may proceed to 314. At 314, method 300 may include selecting one or more engine cylinders to deactivate based on the estimated engine operating conditions. In some examples, a group of cylinders or a bank of cylinders may be deactivated. The selection may be based on, for example, which cylinder or cylinders were deactivated during a previous VDE mode of operation. For example, if during the previous cylinder deactivation condition, a first cylinder or first group of cylinders on a first engine bank were deactivated, then a controller may select a second cylinder or a second group of cylinders on a second engine bank for deactivation during the present VDE mode of operation. As another example, the selection may be based on a regeneration state of a first exhaust catalyst (or emission control device) coupled to the first bank relative to the regeneration state of a second exhaust catalyst (or emission control device) coupled to the second bank.

Following the selection, also at 314, the controller may selectively deactivate the one or more engine cylinders. As used herein, the deactivation may include selectively deactivating (e.g., turning off) a fuel injector of the selected one or more engine cylinders. More specifically, as discussed above, deactivation of one or more engine cylinders as discussed herein may include the controller commanding the selected one or more cylinders to be deactivated just after an exhaust stroke has been conducted. In other words, just after the piston(s) corresponding to the one or more selected cylinder(s) to be deactivated have pushed combustion gases out of the exhaust valve to the exhaust system, the exhaust valve(s) may be commanded closed via the controller (e.g. 12). Furthermore, the intake valve(s) corresponding to the one or more selected cylinder(s) may be commanded/maintained closed via the controller. In this way, rather than trapping a high-pressure charge in the cylinder (see FIG. 3B), a vacuum (negative pressure with respect to atmospheric pressure) may be trapped in the one or more selected cylinder(s). As discussed, trapping the vacuum in the one or more selected cylinder(s) may reduce or eliminate torque bump(s) at deactivation, but may lead to increased oil consumption, spark plug fouling, and/or undesired combustion events if mitigating action is not undertaken.

Accordingly, proceeding to 316, method 300 may include commanding spark to each of the one or more deactivated engine cylinder(s) near BDC. In one example, "near" BDC may comprise within 5 degrees or less of BDC. In another example, "near" BDC may comprise within 10 degrees or less of BDC. In yet another example, "near" BDC may comprise within 20 degrees or less of BDC. In other words, spark may be provided to each of the one or more deactivated engine cylinders within a predetermined threshold (e.g. predetermined number of degrees of) of BDC.

To determine whether a deactivated engine cylinder piston is near BDC (e.g. within a threshold of BDC), a crankshaft position sensor (e.g. 120) and/or one or more camshaft sensor(s) (e.g. 188, 189) may be utilized.

In one example, spark may be provided near BDC (e.g. within the threshold of BDC) at every occasion that the piston(s) corresponding to the deactivated cylinder(s) are near BDC. More specifically, each engine cycle (intake, compression, power, and exhaust stroke) may include two occasions that the piston(s) corresponding to the deactivated cylinder(s) are near BDC. Thus, in one example, each time the piston(s) are near BDC, spark may be provided.

In an example where spark is provided every occasion the piston(s) are within the threshold of BDC, ignition energy of the spark may be controlled via the controller. For example, because spark is provided at each occasion the piston(s) are near BDC, ignition energy may be kept relatively low. In other words, the frequency of sparking (e.g. every BDC occasion) may prevent any oil that may migrate into the deactivated cylinder(s) from fouling the spark plug(s), without a need for increasing ignition energy.

Discussed, herein, increasing the ignition energy of the spark delivered to the cylinder(s) may include increasing an ignition coil dwell timing. As an example, ignition coil dwell timing may be increased by maintaining a voltage applied to the ignition coil of the spark plug at a substantially constant value for a longer duration than a typical ignition coil dwell time. The longer dwell time may increase a primary current that the coil charges to, thus increasing its stored inductive energy. As one example, the typical ignition coil dwell time may comprise 2.5 msec, and increasing the dwell time may comprise increasing the ignition coil dwell time to 2.8 msec, which may thus increase the peak primary current from 8 amps to 10 amps.

Increasing the ignition energy may additionally or alternatively include increasing a number of strikes of the ignition coil for each spark event. Herein, the higher strike frequency is used to increase a number of sparks output by the ignition coil per spark event for the determined number of BDC events following the cylinder deactivation. In one example, the strike frequency may be increased from one strike per spark event to five strikes per spark event.

Discussed herein, ignition energy that is not "increased" may be referred to as "basal" ignition energy. Basal ignition energy may comprise ignition coil dwell time of 2.5 msec, and/or a strike frequency of one strike per spark event. Thus, increasing, or increased ignition energy may comprise ignition energy increased as compared to the basal ignition energy.

In another example, spark may be provided at each occasion of BDC, except for the first occasion of BDC after deactivation. More specifically, each time that spark is provided, electrical energy may be utilized, which may decrease a state of charge (SOC) of an onboard power supply (e.g. battery 195). Thus, in a hybrid vehicle, it may be desirable to use electrical energy as efficiently as possible. Accordingly, in one example, spark may not be provided at the first occasion of BDC after deactivation, but may be provided at every occasion of BDC thereafter. In such an example, the spark provided may comprise the basal ignition energy. In other words, ignition energy may be kept low, as the spark is provided at every occasion of BDC after the first occasion after deactivation. By providing the basal ignition energy spark at every occasion of BDC, any oil that may migrate to the deactivated cylinder(s) may be prevented from fouling the spark plug(s), without increasing ignition energy.

In another example, spark may be provided at every other occasion of BDC after deactivation. In other words, spark may be provided once per engine cycle. In such an example, spark may not be provided at the first BDC occasion after deactivation, but may be provided at the second BDC occasion, and every other BDC occasion thereafter. In one example, ignition energy may be kept at the basal ignition energy for a predetermined number of spark events (e.g. every other BDC occasion), but may then be increased. In one example the predetermined number of spark events that the ignition energy is kept low for may comprise two spark events, three spark events, 5-10 spark events, 10-20 spark events, etc. In one example, the predetermined number of spark events may comprise a number of spark events where substantial oil migration into the cylinder(s) is not yet expected, such that sparking at the basal ignition energy may be sufficient to prevent spark plug fouling. However, after the predetermined number of spark events has elapsed, ignition energy may be increased, as the more time spent in the deactivated state with vacuum trapped in the deactivated cylinder, the more likely that substantial oil migration into the deactivated cylinder may occur. Thus, in such an example, ignition energy may be increased for a remaining duration of the deactivation.

In another example, the spark provided near BDC subsequent to deactivation of one or more engine cylinder(s) may be a function of vehicle speed. For example, a frequency of spark events near BDC may be increased proportional to an increase in vehicle speed, and decreased proportionally to a decrease in vehicle speed. Consider an example where the vehicle is traveling at a higher speed (e.g. 40 mph or greater). Upon deactivation of one or more engine cylinder(s), the rapid speed of the engine may make the engine more prone to oil migration, as compared to when the cylinder(s) are deactivated at lower speeds (e.g. less than 40 mph). Such an example is meant to be illustrative, and is not meant to be limiting in any way. In other words, there may be a threshold vehicle speed (e.g. 40 mph), where if one or more cylinder(s) are deactivated and vehicle speed is above the threshold speed, then frequency of spark events may be increased, as compared to the frequency of spark events if the vehicle speed is below the threshold speed. In one example, if the vehicle speed is above the threshold speed at deactivation, spark may be provided near BDC at every BDC occasion after deactivation. Alternatively, if the vehicle speed is below the threshold speed at deactivation, spark may be provided near BDC at every other BDC occasion after deactivation.

In some examples, frequency of spark provided and/or an ignition energy of spark provided near BDC may be a function of pressure inside the cylinder at deactivation. For example, as pressure in a deactivated cylinder or cylinders becomes more negative with respect to atmospheric pressure, oil migration may be more likely, thus a frequency of spark provided may be increased, and/or ignition energy may be increased. In one example, pressure in deactivated cylinder(s) may be monitored via an in-cylinder pressure sensor (e.g. 185). As one example, at deactivation, pressure in the cylinder(s) may be monitored, and spark may be provided responsive to pressure in the cylinder(s) reaching a predetermined negative pressure or vacuum, with respect to atmospheric pressure. Spark may initially be provided at the basal ignition energy, for example. However, while the cylinder is deactivated, in response to pressure reaching a second negative pressure threshold that is more negative than the first threshold, spark frequency and/or ignition energy may be increased, to reduce oil migration to the deactivated cylinder(s). In some examples, rather than relying on an in-cylinder pressure sensor, other methodology may be utilized to infer in-cylinder pressure. Examples may include time spent in a deactivated state, etc.

In another example where the spark provided near BDC is a function of vehicle speed, the spark provided may comprise increased ignition energy over basal ignition energy if vehicle speed is above the threshold, and lowered (e.g. basal) ignition energy if vehicle speed is below the threshold. For example, if vehicle speed is above the threshold, then the spark provided may comprise the increased ignition energy, without any spark comprising the basal ignition energy. In such an example, spark may be provided at each BDC occasion, or every other BDC occasion. In an example where vehicle speed is below the threshold, then the spark provided may comprise the basal ignition energy. In such an example, the basal ignition energy may be provided at each BDC occasion after deactivation, or every other BDC occasion. Furthermore, the basal ignition energy may be provided for a predetermined number of spark events, similar to that discussed above, and then may be increased subsequent to the predetermined number of spark events elapsing.

It may be understood that the above examples are meant to be illustrative, and that there may be circumstances where frequency of spark events near BDC for a deactivated engine cylinder may be adjusted. For example, it is within the scope of this disclosure to, for example, delay sparking near BDC after deactivation for a predetermined number of BDC occasions (e.g. 1, 2, 3, 4, 5, greater than 5 but less than 10, greater than 10 but less than 20, greater than 20 but less than 30, etc.), and then start sparking near BDC. In such an example, when the sparking is commenced, the sparking may be every other BDC occasion, every other BDC occasion, every third BDC occasion, every fourth BDC occasion, etc. In such an example, ignition energy may comprise the basal ignition energy, or may comprise increased ignition energy. In one example, basal ignition energy may be conducted for each spark event for a predetermined number of spark events, and after the predetermined number of spark events has elapsed, then subsequent spark events may comprise increased ignition energy spark events.

In another example, spark frequency and/or ignition energy provided at each spark event may be a function of oil temperature. For example, at higher oil temperatures, oil migration may be expected to migrate more readily into a deactivated engine cylinder (with trapped vacuum), than at lower oil temperatures. Thus, in response to an indicated oil temperature greater than a threshold, where the threshold comprises an oil temperature where migration of oil into deactivated cylinder(s) is expected to be greater than if engine oil temperature is below the threshold, spark frequency and/or ignition energy provided at each spark event, may be increased, as compared to conditions where engine oil temperature is below the threshold. As discussed above, frequency and/or ignition energy provided may additionally be adjusted as a function of vehicle operating conditions, such as vehicle speed, for example.

The engine may continue to be operated in the VDE mode with one or more engine cylinders deactivated until reactivation conditions are met at step 318 of method 300. In one example, reactivation conditions may be met when engine torque demand increases above a threshold. In another example, reactivation conditions may be considered met when the engine has operated in the VDE mode for a specified duration. Accordingly, at 318, non-VDE conditions may be confirmed. If non-VDE conditions are not confirmed, the engine may continue to be operated in the VDE mode at 320 with the selected deactivated one or more cylinders sealed (e.g. intake and exhaust valve(s) closed, with fueling to the deactivated cylinder(s) stopped, and with spark being provided to the one or more deactivated cylinders near BDC occasions.

Upon confirming non-VDE conditions, at 318, the deactivated cylinder(s) may be reactivated. Specifically, the deactivated fuel injector(s) may be reactivated, and spark may be provided to the deactivated engine cylinder(s). Reactivation of the deactivated engine cylinder(s) may comprise commanding spark to the reactivated cylinder near TDC (e.g. just prior or within a threshold number of degrees of TDC).

In this way, spark plug fouling may be prevented under situations where deactivation of one or more engine cylinder(s) comprises trapping a vacuum in the one or more engine cylinder(s). Such a method may be desirable over a method where a high-pressure charge is trapped in the cylinder(s), because when vacuum is trapped in the cylinder(s), a torque bump may be reduced or eliminated in response to deactivation and/or reactivation. However, as discussed above, there may be conditions where oil quality is such that it may be desirable to trap the high-pressure charge in the deactivated cylinder(s), in order to reduce/prevent oil migration into the cylinder(s), to prevent/reduce opportunities for spark plug fouling, to reduce oil consumption, etc.

Accordingly, returning to step 312 of method 300, if oil quality is indicated to be below the threshold, method 300 may proceed to FIG. 3B.

FIG. 3B depicts a method 350, which may comprise a sub-method of method 300 depicted at FIG. 3A. Method 350 begins at 355, and may include determining which cylinder(s) to deactivate. Selection of which cylinder(s) to deactivate may be conducted as previously discussed at step 314 of method 300, and thus will not be reiterated here for brevity.

Responsive to determining which cylinder(s) are to be deactivated, method 350 may proceed to 360. At 360, method 350 may include deactivating the cylinder(s) by trapping a high-pressure charge in the cylinder(s) selected for deactivation. More specifically, to trap the high-pressure charge in the cylinder(s), the following methodology may be utilized. For the particular cylinder(s), the cylinder(s) may intake air during the intake stroke, and fueling and spark may be provided during the compression stroke (or in some examples fueling may be provided during the intake stroke) to combust air and fuel. However, rather than exhausting the combusted gases, the high-pressure charge may be trapped inside the cylinder(s) by the controller commanding/maintaining closed both the intake and exhaust valves corresponding to the particular cylinder(s) selected for deactivation. By preventing the combusted gases from being routed to the exhaust system, the high-pressure charge (e.g. combusted air and fuel) may be trapped in the cylinder(s). While discussed is the trapping of the high-pressure charge, it may be understood that in some examples, air may be inducted into a cylinder scheduled for deactivation, and then the cylinder may be sealed without combustion (no fueling or spark), thus trapping a positive pressure with respect to atmospheric pressure in the particular cylinder. In some examples, trapping the positive pressure instead of the high-pressure charge may comprise an indication that the oil quality is below the threshold, but greater than a second oil quality threshold, for example. While such action is within the scope of this disclosure, the description with regard to FIG. 3B centers on trapping the high-pressure charge.

It may be understood that, with the high-pressure charge trapped in the cylinder(s), spark may not be provided while the cylinder is deactivated, and fueling to the cylinder(s) is shut off.

In response to the high-pressure charge being trapped in the cylinder(s), method 350 may proceed to 365. Steps 365 to 375 are essentially equivalent to steps 318 to 322 of method 300, and thus will not be reiterated for brevity. Briefly, the cylinder(s) may remain deactivated with the trapped high-pressure charge, until non-VDE conditions are met, at which point the cylinder(s) may be reactivated to combust air and fuel. However, in some examples, even with a high-pressure charge (or positive pressure due to inducting air but not combusting prior to sealing the cylinder) trapped in the cylinder, after some time the cylinder may be susceptible to unintended combustion. Thus, in some examples, pressure in the deactivated cylinder may be monitored (e.g. via in-cylinder pressure sensor 185), and if pressure drops below a threshold, then spark may be provided near BDC in order to reduce or avoid any potential spark plug fouling. If in-cylinder pressure sensor(s) are not included in the vehicle, or are not functioning as desired, in some examples spark may be provided near BDC to a cylinder deactivated by trapping the high-pressure charge or positive pressure after a predetermined number of engine cycles, or after a predetermined time duration elapses, etc.

Turning now to FIG. 4, an example map 400 for providing spark and fueling to an engine cylinder, is shown. In example map 400, a single engine cylinder is shown, for clarity. Furthermore, map 400 illustrates the deactivation of the engine cylinder. More specifically, map 400 includes four engine cycles (engine cycle 1-4), and illustrates the strokes (exhaust, intake, compression, and power) for each engine cycle. For each engine cycle, engine position is illustrated, showing where top dead center (TDC) and bottom dead center (BDC) are in relation to each engine cycle. Map 400 includes plot 405, indicating valve timing. Line 406 illustrates exhaust valve timing, where line 407 illustrates intake valve timing. Map 400 further includes plot 410, indicating piston position in relation to the four engine cycles. Map 400 further includes plot 415, indicating spark ignition energy, in relation to the four engine cycles. Spark ignition energy may be increased (+) or decreased (-). Map 400 further includes plot 420, indicating whether fuel injection to the engine cylinder is on, or off, in relation to the four engine cycles.

Referring to engine cycle 1, the exhaust valve first opens and closes (line 406) during the exhaust stroke, and then the intake valve opens and closes (line 407) during the intake stroke. Spark and fueling are provided to the engine cylinder during the compression stroke. In this example map 400, spark ignition energy may be understood to comprise basal spark ignition energy.

Engine cycle 2 depicts the same process as engine cycle 1. In other words, engine cycle 1 and engine cycle 2 illustrate conditions where the cylinder is not deactivated, thus the intake and exhaust valves are opening and closing, and fuel injection and spark are being provided to the engine. In other words, engine cycle 1 and engine cycle 2 depict engine cycles where conditions are not met for operating the engine in VDE mode.

Engine cycle 3 illustrates the exhaust valve opening, and then closing. It may be understood that at engine cycle 3, conditions are met for operating the engine in VDE mode. For clarity, the engine cylinder depicted at map 400 comprises the cylinder selected for deactivation (although there may be other cylinders additionally selected, depending of vehicle operating conditions). Accordingly, after the exhaust stroke, where the exhaust stroke includes the exhaust valve opening, and then closing, the intake valve is commanded closed/maintained closed via the controller, and fuel injection is stopped (e.g. fuel injection is off). By closing the exhaust valve (and maintaining the intake valve closed, without fuel injection) after exhaust gases are pushed out of the cylinder, a vacuum may develop in the deactivated cylinder. Such a vacuum may result in oil migration into the cylinder, as discussed above. Thus, to prevent fouling of the spark plug while the cylinder is deactivated, spark may be provided at BDC, discussed above, and which will be further discussed below.

At engine cycle 3, the piston is at BDC just after the intake stroke subsequent to deactivation, however in this example map 400, spark is not provided at the first BDC occasion. Rather, spark is provided at the second BDC occasion (just after the power stroke in engine cycle 3). As discussed above, providing spark at BDC may comprise providing spark "near" BDC, which may include providing spark within a predetermined threshold (predetermined crank angle degrees) of BDC. Referring to engine cycle 4, spark is provided at every BDC occasion after the second BDC occasion. In example map 400, it may be understood that the ignition energy provided at each spark event comprises the basal ignition energy.

In other words, example map 400 depicts a situation where spark is delayed (for one BDC occasion after deactivation), but where spark is provided at every BDC occasion subsequent to the first BDC occasion. Because spark is provided at every BDC occasion subsequent to the first BDC occasion, spark ignition energy comprises the basal ignition energy, as due to the frequency of sparking (e.g. every BDC occasion after the first BDC occasion), it may be expected that spark plug fouling may be avoided.

Example map 400 only illustrates four engine cycles, but it may be understood that deactivation of the engine cylinder illustrated at FIG. 4 may be conducted for any number of engine cycles. Thus, it may be understood that subsequent to engine cycle 4, spark may continue to be provided at every BDC occasion, where the spark provided comprises the basal ignition energy. In response to conditions being met for reactivating the deactivated cylinder, it may be understood that the fuel injectors may be reactivated to provide fueling to the cylinder, and spark may be provided near TDC (e.g. just prior to or within a threshold of TDC).

Turning now to FIG. 5, an example map 500 for providing spark to a deactivated engine cylinder, is shown. Similar to that discussed above for FIG. 4, FIG. 5 illustrates a single engine cylinder, for clarity. Map 500 includes four engine cycles (engine cycle 1-4), and illustrates the strokes (exhaust, intake, compression, and power) for each engine cycle. For each engine cycle, engine position is illustrated, showing where TDC and BDC are in relation to each engine cycle. Map 500 includes plot 505, indicating valve timing. Line 506 illustrates exhaust valve timing. Map 500 further includes plot 510, indicating piston position in relation to the four engine cycles. Map 500 further includes plot 515, indicating spark ignition energy, in relation to the four engine cycles. Map 500 further includes plot 520, indicating whether fuel injection to the engine cylinder is on, or off, in relation to the four engine cycles. Example map 500 depicts a situation where VDE conditions are indicated to be met, and the cylinder selected for deactivation comprises the cylinder illustrated at map 500. Thus the cylinder is deactivated at engine cycle 1, as will be discussed in further detail below.

Referring to engine cycle 1, it may be understood that VDE conditions are met, thus the exhaust valve first opens and closes (line 506) during the exhaust stroke. As the cylinder is selected for deactivation, the intake valve is maintained closed at engine cycle 1. As discussed above, by opening the exhaust valve and then closing it, to deactivate the cylinder, a vacuum may be trapped in the cylinder, which may encourage migration of oil into the cylinder, if mitigating actions are not undertaken. Thus, to prevent fouling of the spark plug corresponding to the deactivated cylinder as a result of the oil migration, spark may be provided near BDC. In this example map 500, it may be understood that it illustrates a situation where spark is provided at every other BDC occasion, and where the first two BDC occasions include providing spark at the basal ignition energy, whereas subsequent BDC occasions include providing spark at increased ignition energy (as compared to the basal ignition energy).

Thus, referring to engine cycle 1, subsequent to deactivation of the cylinder, where fuel is shut off to the engine cylinder (plot 520), spark is not provided at the first BDC occasion, but spark is provided at the second BDC occasion. Similarly, referring to engine cycle 2, 3, and 4, spark is provided once per engine cycle. By providing spark near BDC, it may be understood that no combustion is expected, due to the large cylinder volume when the piston is near BDC. In other words, even if a combustion event were to happen when the piston is near BDC, no torque may be produced. By providing spark once per engine cycle, rather than at each BDC occasion, spark plug fouling may be reduced or prevented, and battery power may be reduced, as compared to providing spark at every BDC occasion. Thus, such a method of providing spark every other BDC occasion may be a function of a SOC of the battery, in one example. For instance, if battery charge is below a threshold, then it may be desirable to provide spark in a fashion where spark is provided every other BDC occasion, or once per engine cycle.

After the first two spark events at the basal ignition energy (engine cycle 1 and engine cycle 2), subsequent spark events (engine cycle 3 and engine cycle 4) are illustrated to comprise increased ignition energy as compared to the basal ignition energy. In other words, because the spark is only provided once per engine cycle, as the deactivation time (and number of engine cycles) increases, the opportunity for oil migration (and thus spark plug fouling), increases. Thus, after a predetermined number of spark events (two in this example map 500) at the basal ignition energy, spark energy may be increased, to ensure that spark fouling does not occur. It may be understood that providing increased ignition energy may comprise utilizing more energy stored in the battery, thus the amount of increased ignition energy may be a function of battery SOC. For example, the ignition energy for each spark event (post-basal ignition energy spark events) may be controlled via the controller so as to maintain a desired battery SOC for a subsequent application. In other words, ignition energy may be controlled so as to maintain a threshold battery SOC. The threshold SOC may comprise a battery SOC where subsequent applications that use battery power are not adversely affected.

Example map 500 only illustrates four engine cycles, but it may be understood that deactivation of the engine cylinder illustrated at FIG. 5 may be conducted for any number of engine cycles. Thus, it may be understood that subsequent to engine cycle 4, spark may continue to be provided at every other BDC occasion, where the spark provided comprises the increased ignition energy. In response to conditions being met for reactivating the deactivated cylinder, it may be understood that the fuel injectors may be reactivated to provide fueling to the cylinder, and spark may be provided near TDC (e.g. just prior or within a threshold of TDC).

Turning now to FIG. 6, another example map 600 for providing spark to a deactivated engine cylinder, is shown. Similar to that discussed above at FIG. 4 and FIG. 5, a single engine cylinder is illustrated, for clarity. Map 600 includes a number of engine cycles, including engine cycle 1, engine cycle 2, engine cycle "n" (which may occur some duration of time after engine cycle 2), and engine cycle "n+1", which may occur just after engine cycle "n". For each engine cycle shown, the strokes (exhaust, intake, compression, and power) are shown. For each engine cycle, engine position is illustrated, showing where TDC and BDC are in relation to each engine cycle. Map 600 includes plot 605, indicating valve timing. Line 606 illustrates exhaust valve timing. Map 600 further includes plot 610, indicating piston position in relation to the engine cycles. Map 600 further includes plot 615, indicating spark ignition energy, in relation to the engine cycles. Map 600 further includes plot 620, indicating whether fuel injection to the engine cylinder is on, or off, in relation to the engine cycles. Example map 600 depicts a situation where VDE conditions are indicated to be met, and the cylinder selected for deactivation comprises the cylinder illustrated at map 600. Thus, the cylinder is deactivated at engine cycle 1, as will be discussed in further detail below.

Referring to engine cycle 1, it may be understood that VDE conditions are met, thus the exhaust valve first opens and closes (line 606) during the exhaust stroke. As the cylinder is selected for deactivation, the intake valve is maintained closed at engine cycle 1. As discussed above, by opening the exhaust valve and then closing it, to deactivate the cylinder, a vacuum may be trapped in the cylinder, which may encourage migration of oil into the cylinder, if mitigating actions are not undertaken. Thus, to prevent fouling of the spark plug corresponding to the deactivated cylinder as a result of the oil migration, spark may be provided near BDC (e.g. within a threshold of BDC). In this example map 600, it may be understood that it illustrates a situation where spark is provided at every BDC occasion, and where the spark provided comprises the basal ignition energy for a predetermined number of engine cycles (or predetermined duration in some examples), and then transitions to an increased ignition energy after the predetermined number of engine cycles, or predetermined duration of time, elapses.

Thus, referring to engine cycle 1, subsequent to deactivation of the cylinder, where fuel is shut off to the engine cylinder (plot 620), spark is provided at the first BDC occasion, and every BDC occasion thereafter (see engine cycles 2, n, and n+1). In other words, spark is provided twice per engine cycle. Initially, the spark provided comprises the basal ignition energy, indicated at engine cycle 1 and engine cycle 2. The spark comprising the basal ignition energy is provided for a predetermined number of engine cycles. The predetermined number of engine cycles may comprise a number of engine cycles where it may be expected that providing the basal ignition energy may be sufficient to prevent fouling of the spark plug. In some examples, the predetermined number of engine cycles may be a function of engine load, vehicle speed, engine speed, oil temperature, etc. In other words, the number of predetermined engine cycles for which the basal ignition energy is provided may be variable as a function of vehicle operating conditions.

Subsequent to the predetermined number of engine cycles where the basal ignition energy is provided elapsing, the ignition energy may be increased for any subsequent engine cycles. Similarly to the engine cycles where the basal ignition energy is provided at each BDC occasion, after increasing the ignition energy, the increased ignition energy may be provided at each subsequent BDC occasion. Alternatively, in some examples after increasing the ignition energy, spark may only be provided every other BDC occasion. Depicted at map 600, engine cycle n corresponds to the first engine cycle where the spark ignition energy has been increased, and engine cycle n+1 corresponds to the second engine cycle after spark ignition energy has been increased.

As discussed above, by providing spark at BDC, it may be understood that no combustion is expected, due to the large cylinder volume when the piston is at BDC. Furthermore, even if a combustion event were to happen at BDC, because the piston is at BDC, no torque may be produced. By providing spark twice per engine cycle, spark plug fouling may be reduced or prevented. In some examples, such a method of providing spark at every BDC occasion may be a function of a SOC of the battery. For instance, if battery charge is above a threshold, then it may be desirable to provide spark in a fashion where spark is provided every BDC occasion, or twice per engine cycle. The threshold battery charge may comprise an amount of charge where, providing spark at every BDC occasion may not deplete the battery to a level where it may adversely affect any subsequent vehicle operating conditions which may utilize power from the battery.

Turning now to FIG. 7, another example map 700 is shown. Specifically, map 700 illustrates a situation where, for a particular drive cycle with two VDE events, one of the VDE events is conducted via trapping vacuum in a cylinder or cylinders selected for deactivation, whereas the other VDE event is conducted via trapping a high-pressure charge in the cylinder or cylinders selected for deactivation. Similar to that discussed above at FIGS. 4-6, a single engine cylinder is depicted at FIG. 7, for clarity. Map 700 includes a number of engine cycles, depicted as E, I, C, and P, corresponding to exhaust, intake, compression, and power strokes, respectively. Furthermore, similar to FIGS. 4-6, map 700 illustrates engine position, showing where TDC (T) and BDC (B) are in relation to each engine cycle. Map 700 includes plot 705, indicating valve timing. For example map 700, it may be understood that a valve shown opening and closing during the exhaust stroke (E) corresponds to an exhaust valve for the cylinder, and a valve shown opening and closing during the intake stroke (I) corresponds to an intake valve for the cylinder. Map 700 further includes plot 710, indicating piston position in relation to the engine cycles. Map 700 further includes plot 715, indicating spark ignition energy, in relation to the engine cycles. Map 700 further includes plot 720, indicating whether fuel injection to the engine cylinder is on, or off, in relation to the engine cycles. Map 700 further includes plot 725, indicating a quality of oil (e.g. engine oil, or motor oil) that is used to lubricate, clean and/or draw heat from, the engine. Line 726 represents a threshold oil quality where, above the threshold a VDE event may comprise deactivating the cylinder to trap vacuum, whereas if oil quality is below the threshold oil quality, then responsive to a VDE event, the cylinder may trap a high-pressure charge.

It may be understood that map 700 depicts a single drive cycle, the single drive cycle divided up into five segments, which will be elaborated upon below.

Segment 1 illustrates a portion of the drive cycle where VDE conditions are met, and oil quality is above the threshold oil quality. Furthermore, it may be understood that the cylinder illustrated at map 700 comprises a cylinder selected for deactivation. Accordingly, with oil quality above the threshold, the exhaust valve opens and then closes, to deactivate the cylinder. In other words, it may be understood that the exhaust valve opens to route combusted gases out of the cylinder, and then the exhaust valve closes, thus trapping a vacuum in the cylinder. As discussed above, trapping vacuum inside the cylinder may result in oil migration to the cylinder, which may result in fouling of the spark plug. Thus, to mitigate such an issue, as illustrated at map 700, spark is provided at every other BDC occasion while the cylinder is deactivated. It may be understood in example map 700 that the spark provided comprises the basal spark ignition energy. By continuing to spark near BDC while fueling is cut off from the deactivated cylinder, and with the vacuum trapped in the sealed cylinder (intake and exhaust valves closed), fouling of the spark plug may be prevented or reduced during segment 1 of the drive cycle.

At the end of segment 1, while not specifically illustrated, it may be understood that conditions are met for reactivating the engine cylinder. As discussed above, such conditions may include a torque demand that cannot be met with the cylinder (or cylinders) deactivated. Accordingly, segment 2 depicts a portion of the drive cycle where the exhaust valve and intake valve resume operation, and fueling and spark are provided. Importantly, spark is provided just in advance of TDC when the cylinder is reactivated, as opposed to near BDC when the cylinder is deactivated.

Operation of the engine proceeds for a duration of time, illustrated as segment 3, with the cylinder combusting air and fuel. While not explicitly illustrated, it may be understood that other cylinder(s) of the engine may be deactivated during segment 3, but for the cylinder shown, it may be understood that the cylinder continues to combust air and fuel throughout the duration of segment 3.

Segment 4 illustrates a segment of the drive cycle where the engine cylinder is combusting air and fuel. At the end of segment 4, it may be understood that conditions are met for deactivating the illustrated cylinder. However, oil quality has degraded to below the oil quality threshold (plot 725). Accordingly, rather than trapping a vacuum in the cylinder, it may be desirable to trap a high-pressure charge to prevent oil migration to the deactivated cylinder. Accordingly, it may be understood that at the beginning of segment 5, the cylinder is deactivated, which includes the cylinder taking in intake air, providing fuel and spark to the cylinder, but where the exhaust valve is not opened (and the intake valve is maintained closed), after the final combustion event (fueling and spark provided) prior to deactivation. After the cylinder is deactivated with the trapped high-pressure charge, spark is not provided to the cylinder, and fueling is cut off. In this way, when oil quality is below the threshold oil quality, oil may be prevented from migrating to the deactivated cylinder during a VDE event.

While not explicitly illustrated, it may be understood that after segment 5, the engine may be reactivated, to complete the drive cycle, etc.

Thus, the methods depicted at FIGS. 3A-3B may enable a method comprising in a first operating condition of a vehicle propelled by a variable displacement engine, including an indication that an oil quality of an oil utilized for cooling, lubrication and/or cleaning of the variable displacement engine is greater than an oil quality threshold, operating the vehicle in a first mode that includes selectively deactivating a cylinder of the variable displacement engine by trapping a vacuum in the cylinder. Such a method may further include, in a second operating condition of the vehicle, including an indication that the oil quality of the oil is lower than the oil quality threshold, operating the vehicle in a second mode that includes selectively deactivating the cylinder by trapping a high-pressure charge in the cylinder. In such a method, operating the vehicle in the first mode further comprises, subsequent to deactivating the cylinder, providing a spark event to the cylinder when a piston coupled to the cylinder is within a threshold of bottom dead center, where bottom dead center comprises a position of the piston where the piston is nearest to a crankshaft of the variable displacement engine.

In one example of such a method, providing the spark event may be a function of in-cylinder pressure. Furthermore, in some examples the spark event may be provided either once per an engine cycle, or twice per the engine cycle, where the engine cycle includes an exhaust stroke, an intake stroke, a compression stroke, and a power stroke, and wherein each spark event includes one or more strikes of an ignition coil of a spark plug configured to provide the spark event. Still further, an ignition energy of the spark event may be variable as a function of vehicle operating conditions.

In another example of such a method, deactivating the cylinder in the second mode by trapping the high-pressure charge in the cylinder may further comprise combusting a mixture of air and fuel in the cylinder with the cylinder sealed from atmosphere, and then maintaining the cylinder sealed with combusted air and fuel trapped in the cylinder.

Still further, in such a method, both the first mode and the second mode may include stopping injection of fuel provided to the cylinder, and wherein the second mode may includes additionally stopping providing spark to the cylinder.

Another example of a method with regard to FIGS. 3A-3B may comprise reducing fouling of a spark plug in a cylinder of an engine configured to propel a vehicle by providing a spark to the cylinder after the cylinder has been deactivated, where the spark is provided when a piston coupled to the cylinder is within a threshold of bottom dead center. By providing spark when the piston is within the threshold of bottom dead center, undesired combustion events may be reduced or eliminated, while spark plug fouling may additionally be reduced or eliminated.

As one example, the engine may comprise a variable displacement engine, and where providing the spark to the cylinder after the cylinder has been deactivated occurs in response to the cylinder being deactivated via trapping a negative pressure with respect to atmospheric pressure in the cylinder at deactivation. In such an example, trapping the negative pressure at deactivation may include exhausting a combusted mixture of air and fuel to an exhaust system of the engine, and then sealing the cylinder from atmosphere.

In examples where a plurality of cylinders are selected for deactivation, such a method as that described above may include providing spark to the plurality of cylinders in response to deactivation of the plurality of cylinders, at the predefined position of a plurality of pistons coupled to the plurality of cylinders.

In some examples of such a method, a spark ignition energy comprising the spark provided to the cylinder after deactivation of the cylinder, is variable. For example, spark ignition energy may be increased after a predetermined number of spark events, while the cylinder is deactivated. Furthermore, in some examples, a spark frequency of the spark provided to the cylinder may be variable as a function of vehicle operating conditions.

The methodology with regard to FIGS. 3A-3B, along with the maps corresponding to FIGS. 4-7 depict example scenarios for preventing spark plug fouling when one or more cylinders of an engine are deactivated. Such methodology relies on providing spark near BDC for deactivated cylinder(s), as discussed in detail above, to reduce or avoid unintended combustion events while the cylinder(s) are deactivated. However, it is recognized herein that there may be circumstances where an unintended combustion event or events may still occur even under conditions where spark is provided near BDC, and that in the event of such an occurrence, mitigating actions may be undertaken in order to reduce undesired consequences of such unintended combustion event(s). Accordingly, FIGS. 8A-8B depict another embodiment or example of the methodology depicted at FIGS. 3A-3B, where the engine is monitored for unintended combustion events while one or more cylinders are deactivated, and in response to an indication of unintended combustion event(s), mitigating actions are undertaken.

Figure 8A:
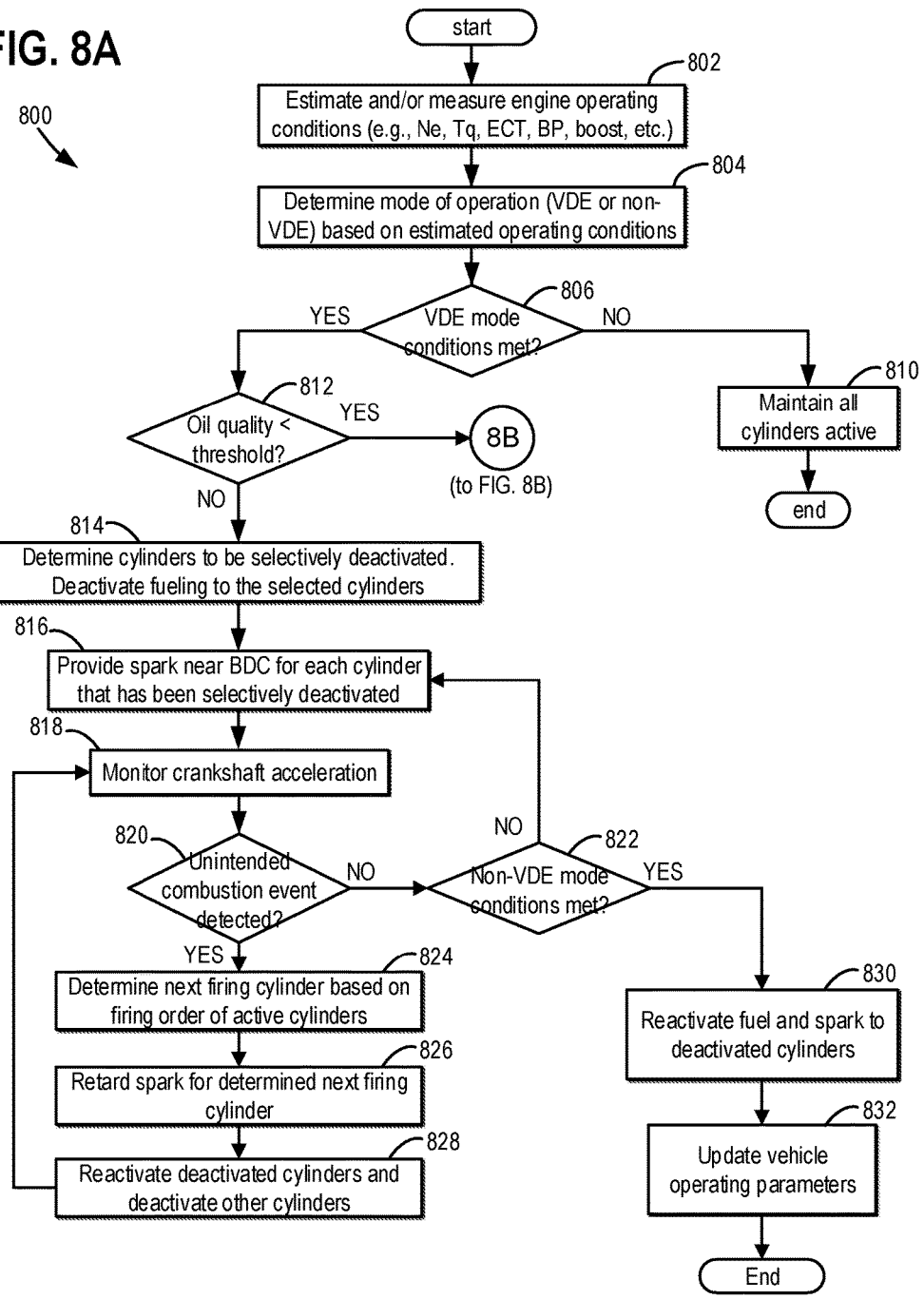
FIG. 8A shows an example method for selecting a cylinder deactivation strategy, for conducting cylinder deactivation via trapping vacuum in a cylinder selected for deactivation, and for mitigating a torque bump resulting from an unintended combustion event.
Figure 8B:
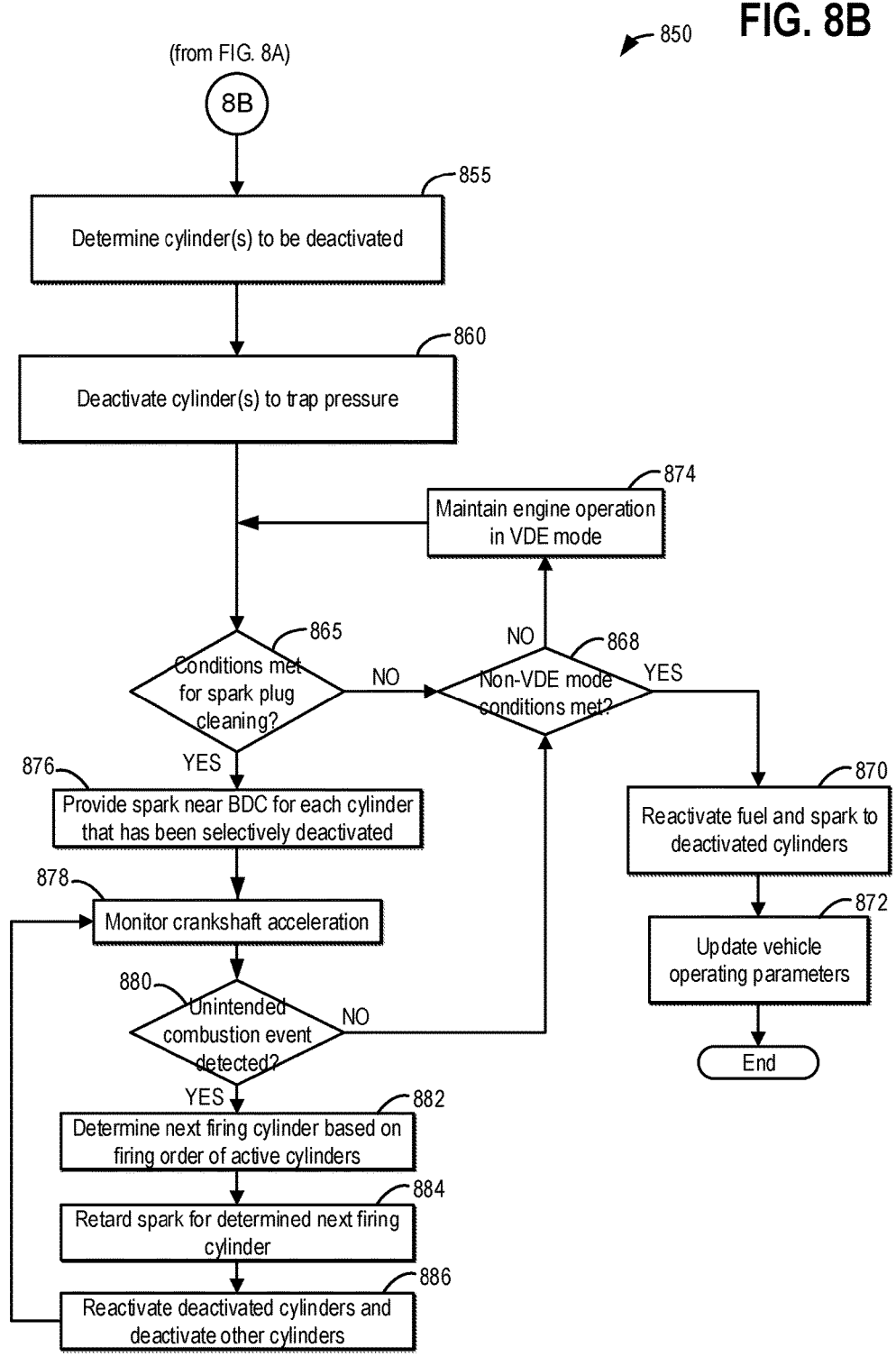
FIG. 8B shows an example method that continues from FIG. 8A, and includes conducting cylinder deactivation via trapping a positive pressure in a cylinder or cylinders selected for deactivation, and mitigating a torque bump resulting from an unintended combustion event.

Thus, turning to FIG. 8A, it depicts a flowchart for a high-level example method 800 for reducing spark plug fouling during operation of an engine in a VDE mode, where the mechanism for deactivating cylinders of the engine is a function of oil quality, and where mitigating actions are undertaken in response to an indication of unintended combustion during the operation of the engine in VDE mode. Method 800 will be described in reference to the systems described in FIGS. 1-2, though it should be understood that method 800 may be applied to other systems without departing from the scope of this disclosure. Method 800 may be carried out by a controller, such as controller 12, and may be stored as executable instructions in non-transitory memory. Instructions for carrying out method 800 and the rest of the methods included herein may be executed by the controller based on instructions stored on a memory of the controller and in conjunction with signals received from sensors of the vehicle system, such as the sensors described above with reference to FIGS. 1-2. The controller may employ engine system actuators such as spark plug(s) (e.g. 192), fuel injector(s) (e.g. 166), etc., according to the methods depicted below.

It may be understood that there are a number of steps of method 800 that are the same or essentially the same as steps of method 300 discussed above. Thus, such steps will be briefly described at FIG. 8A for brevity.

Method 800 begins at 802, and may include estimating and/or measuring engine operating conditions. These may include, for example, engine speed, desired torque (for example, from a pedal-position sensor), manifold pressure (MAP), manifold air flow (MAF), BP, engine temperature, catalyst temperature, intake temperature, spark timing, air temperature, knock limits, etc.

Proceeding to 804, method 800 may include determining, based on the estimated operating conditions, an engine mode of operation (e.g., VDE or non-VDE) (see step 304 of method 300).

Proceeding to 806, method 800 may include confirming whether VDE conditions are met. In one example, cylinder deactivation conditions may be confirmed when torque demand is less than a threshold. If cylinder deactivation conditions are confirmed, a VDE mode is selected. If cylinder deactivation conditions are not confirmed, at 810, the routine includes maintaining all the cylinders active and combusting.

If cylinder deactivation conditions and a VDE mode of operation are confirmed, then method 800 may proceed to 812. At 812, method 800 may include determining a quality of oil included in the engine for lubrication, cleaning, and cooling of various engine components. As discussed above at step 312 of method 300, determining a quality of oil at 312 may include determining whether the quality of the oil is above an oil quality threshold, or below the oil quality threshold, where oil quality above the threshold indicates higher (e.g. better) quality oil, and where oil quality below the threshold indicates lower (e.g. lesser) quality oil. Higher, or better, quality oil may comprise oil which is more effective at lubricating, cleaning, and/or drawing heat from the engine, whereas lower quality, or lesser quality oil may comprise oil which is less effective at lubricating, cleaning, and/or drawing heat from the engine. What dictates the oil quality threshold, and circumstances for adjusting such an oil quality threshold have been discussed in detail above at 312, and thus will not be reiterated here for brevity.

At 812, if oil quality is indicated to be below the threshold, method 800 may proceed to FIG. 8B, where deactivation of the one or more engine cylinder(s) may be conducted such that a pressure (positive pressure with respect to atmospheric pressure), which may reduce the potential for spark plug fouling by reducing/preventing oil migration into the cylinder(s), is trapped in the cylinder(s). As discussed, a disadvantage to such a method may be a torque bump present at deactivation. Thus, where possible, it may be desirable to deactivate the cylinder(s) by trapping a vacuum rather than a pressure.

Alternatively, at 812, in response to an indication that oil quality is greater than the oil quality threshold, method 800 may proceed to 814. At 814, method 800 may include selecting one or more engine cylinders to deactivate based on the estimated engine operating conditions. In some examples, a group of cylinders or a bank of cylinders may be deactivated. The selection may be based on, for example, which cylinder or cylinders were deactivated during a previous VDE mode of operation. For example, if during the previous cylinder deactivation condition, a first cylinder or first group of cylinders on a first engine bank were deactivated, then a controller may select a second cylinder or a second group of cylinders on a second engine bank for deactivation during the present VDE mode of operation. As another example, the selection may be based on a regeneration state of a first exhaust catalyst (or emission control device) coupled to the first bank relative to the regeneration state of a second exhaust catalyst (or emission control device) coupled to the second bank.

In still another example, which will be elaborated on below, determining which cylinder(s) to deactivate at 814 may be a function of whether particular cylinder(s) are indicated to be prone to unintended combustion events when deactivated via trapping vacuum in the cylinder(s). For example, if a particular cylinder or cylinder(s) have previously been indicated to result in unintended combustion events while deactivated, then such cylinder(s) may be prevented from being deactivated, while those other cylinder(s) that have not been indicated as being susceptible to unintended combustion events may comprise cylinders which may be deactivated.

Following the selection, also at 814, the controller may selectively deactivate the one or more engine cylinders via trapping vacuum in the one or more cylinder(s), as discussed above. In this way, rather than trapping a positive pressure with respect to atmospheric pressure or a high-pressure charge in the cylinder (see FIG. 3B), a vacuum (negative pressure with respect to atmospheric pressure) may be trapped in the one or more selected cylinder(s). As discussed, trapping the vacuum in the one or more selected cylinder(s) may reduce or eliminate torque bump(s) at deactivation, but may lead to increased oil consumption, spark plug fouling, and/or undesired combustion events if appropriate mitigating action is not undertaken.

Thus, proceeding to 816, method 800 may include commanding spark to each of the one or more deactivated engine cylinder(s) near BDC. As discussed above, in one example, "near" BDC may comprise within 5 degrees or less of BDC, within 10 degrees or less of BDC, or within 20 degrees or less of BDC.

To determine whether a deactivated engine cylinder piston is near BDC (e.g. within a threshold of BDC), a crankshaft position sensor (e.g. 120) and/or one or more camshaft sensor(s) (e.g. 188, 189) may be utilized.

At step 316 of method 300 discussed above at FIG. 3A, it was extensively discussed as to how frequently spark may be provided near BDC, and how ignition energy for each spark event may be adjusted. Thus, such information will not be provided here for brevity, but it may be understood that the description above with regard to step 316 of method 300 applies equally to step 816 of method 800.

As discussed, providing spark near BDC may prevent undesired fouling of the spark plug(s) corresponding to deactivated cylinder(s), and furthermore, by providing spark near BDC unintended combustion events may be reduced. However, there may be circumstances where an unintended combustion event or events still occur. Accordingly, in response to such occurrences, mitigating actions may be taken, the details of which are provided in the continuing discussion with regard to the method of FIG. 8A.

Thus, proceeding to 818, method 800 may include monitoring crankshaft acceleration. Crankshaft acceleration may be monitored, for example, at least in part via a crankshaft position sensor (e.g. 120). With crankshaft acceleration being monitored at 818, method 800 may proceed to 820. At 820, method 800 may include indicating whether an unintended combustion event is detected. More specifically, an unintended combustion event may be indicated if crankshaft acceleration exceeds a predetermined crankshaft acceleration threshold. For example, the crankshaft acceleration threshold may be a function of vehicle speed, engine speed, engine load, or other operating conditions that may affect crankshaft acceleration. As one example, an expected crankshaft acceleration may be indicated via a lookup table stored at the controller, the lookup table a function of one or more of vehicle speed, engine speed, engine load, etc. Then, another lookup table may include information as to what crankshaft acceleration threshold to utilize as a function of the expected crankshaft acceleration. In some examples, the crankshaft acceleration threshold may be a fixed amount of acceleration greater than the expected crankshaft acceleration.

If, at 820, crankshaft acceleration is not greater than the crankshaft acceleration threshold, or in other words unintended combustion is not indicated, method 800 may proceed to 822. At 822, method 800 may include indicating whether non-VDE mode conditions, or in other words, reactivation conditions, are met. As discussed above, reactivation conditions may be met when engine torque demand increases above a threshold. In another example, reactivation conditions may be considered met when the engine has operated in the VDE mode for a specified duration. Accordingly, at 822, non-VDE conditions may be confirmed. If non-VDE conditions are not confirmed, the engine may continue to be operated in the VDE mode with the selected deactivated one or more cylinders sealed (e.g. intake and exhaust valve(s) closed) with fueling to the deactivated cylinder(s) stopped, and with spark being provided to the one or more deactivated cylinders near BDC occasions.

Alternatively, upon confirming non-VDE conditions at 822, the deactivated cylinder(s) may be reactivated at 830. Specifically, the deactivated fuel injector(s) may be reactivated, and spark may be provided to the deactivated engine cylinder(s). Reactivation of the deactivated engine cylinder(s) may comprise commanding spark to the reactivated cylinder(s) near TDC (e.g. just prior or within a threshold number of degrees of TDC).

In response to reactivation of the engine cylinders at 830, method 800 may proceed to 832. At 832, method 800 may include updating vehicle operating parameters. For example, updating vehicle operating parameters at 832 may include storing information collected during the time that the engine was operated in the VDE mode at the controller. More specifically, such information may include whether or not unintended combustion events were detected, or not. In an example where no unintended combustion events were detected, such information may be stored at the controller, in order to indicate that no particular engine cylinders are, at the moment, prone or susceptible to unintended combustion events. Thus, updating vehicle operating parameters at 832 may include not specifying any particular engine cylinder as being susceptible or prone to unintended combustion events while deactivated with trapped vacuum. However, updating vehicle operating parameters at 832 may include storing information as to which engine cylinder(s) were deactivated, such that for a subsequent time when a request to operate the engine in VDE mode is indicated, remaining cylinder(s) may be deactivated while the recently deactivated cylinders may be kept activated. Method 800 may then end.

Returning to 820, in response to an indication of unintended combustion, method 800 may proceed to 824. At 824, method 800 may include determining a next firing cylinder, where the next firing cylinder includes the very next cylinder expected or scheduled to fire subsequent to the unintended combustion event. Such an indication may be based on firing order of the activated cylinders, in one example.

With the next firing cylinder determined at 824, method 800 may proceed to 826. At 826, method 800 may include retarding spark for the determined next firing cylinder. Retarding spark at 826 may be a function of the crankshaft acceleration indicated at 820, for example. More specifically, based on the crankshaft acceleration indicated at 820, an amount of increased torque provided via the engine due to the unintended combustion may be determined. In order to offset this increased torque, to thus make torque output of the engine equal to an average requested torque output, spark to the next firing cylinder may be retarded a determined amount. In this way, a torque bump that would typically occur as a result of the unintended combustion event, may be reduced or avoided altogether.

Subsequent to mitigating the torque bump that may otherwise occur if spark is not retarded for the cylinder scheduled to fire next after the unintended combustion event, method 800 may proceed to 828. At 828, method 800 may include setting the deactivated cylinder(s) to become the activated, firing cylinders, whereas the activated cylinders may be deactivated. In other words, the firing and non-firing (deactivated) cylinder(s) may be set to another group of firing and non-firing cylinders. It may be understood that setting the deactivated cylinder(s) to become activated cylinders while deactivating the currently activated cylinders may comprise keeping a total torque output the same as prior to the switching of cylinder status.

At 828, reactivation of the cylinder that was indicated as producing unintended combustion may be conducted as follows. First, the exhaust valve may be opened, thus clearing the cylinder with unintended combustion of residual burnt gas due to the unintended combustion, prior to inducting an air/fuel charge and providing spark to the particular cylinder.

Once the mitigating actions have been undertaken to avoid the torque bump due to unintended combustion, and to clear residual burnt gas from the cylinder that produced the unintended combustion, method 800 may continue to monitor crankshaft acceleration in order to indicate whether any more unintended combustion events are detected. In a case where another unintended combustion event is indicated, while not explicitly illustrated, it may be understood that steps 824-828 may again be conducted, but where a deactivated cylinder that previously was indicated as being a source of unintended combustion may not be selected for reactivation during the switching of deactivated to reactivated cylinders, and vice versa, at step 828. In other words, any cylinder indicated as being susceptible or prone to unintended combustion may be designated as a cylinder that may not be selected for deactivation.

In the absence of further unintended combustion events, method 800 may proceed to 822, where it may be indicated as to whether non-VDE mode conditions are met. If not, method 800 may return to 816, where spark may be provided near BDC for deactivated cylinder(s), and where crankshaft acceleration may continue to be monitored in order to indicate any unintended combustion events.

Returning to 822, responsive to non-VDE mode conditions being indicated to be met, method 800 may proceed to 830. As discussed, at 830, method 800 may include reactivating the deactivated engine cylinders. More specifically, fueling and spark may be resumed to the deactivated cylinders. It may be understood that when reactivating the deactivated cylinders, even though such cylinders may not have experienced an unintended combustion event, there may be crankcase vapors and/or oil migration into the cylinder that may have occurred. Thus, for reactivation of the cylinders, in some examples the contents of the cylinder(s) may be first exhausted to the exhaust system via opening the exhaust valve coupled to such cylinder(s), prior to inducting an air/fuel charge and providing spark to reactivate such cylinder(s).

Proceeding to 832, method 800 may include updating vehicle operating parameters. More specifically, updating vehicle operating parameters at 832 may include storing information at the controller as to which particular cylinder or cylinders are prone to unintended combustion events, such that at a subsequent time when VDE-mode conditions are met, such cylinders are not deactivated. In other words, the controller may designate engine cylinders that have been indicated to be prone to unintended combustion, as non-deactivatable until the vehicle has been serviced via a technician and until the issues related to the unintended combustion have been mitigated. Thus, in some examples, a malfunction indicator light (MIL) may be illuminated at the vehicle dash, indicating which cylinder(s) resulted in unintended combustion, such that such undesired effects may be mitigated. Method 800 may then end.

Returning to 812, in a case where oil quality is indicated as being below the oil quality threshold, method 800 may proceed to FIG. 8B, as discussed. Accordingly, turning to FIG. 8B, it depicts an example method 850 for deactivating particular engine cylinders by trapping a positive pressure with respect to atmospheric pressure in the cylinder(s) set for deactivation. Furthermore, such a method may include conducting a spark plug cleaning routine while the cylinders are deactivated, provided that conditions are indicated to be met for conducting such a routine. As method 850 stems from method 800, method 850 will be described in reference to the systems described in FIGS. 1-2, though it should be understood that method 850 may be applied to other systems without departing from the scope of this disclosure. Method 850 may be carried out by a controller, such as controller 12, and may be stored as executable instructions in non-transitory memory. Instructions for carrying out method 850 and the rest of the methods included herein may be executed by the controller based on instructions stored on a memory of the controller and in conjunction with signals received from sensors of the vehicle system, such as the sensors described above with reference to FIGS. 1-2. The controller may employ engine system actuators such as spark plug(s) (e.g. 192), fuel injector(s) (e.g. 166), etc., according to the methods depicted below.

Method 850 begins at 855, and may include determining which cylinder(s) to deactivate. As discussed above in detail at step 314 of FIG. 3A, in some examples a group of cylinders or a bank of cylinders may be deactivated, where such selection may be based on which cylinder or cylinders were deactivated during a previous VDE mode of operation. In other examples, the selection may be additionally or alternatively based on a regeneration state of a first exhaust catalyst or emission control device coupled to the first bank relative to the regeneration state of a second exhaust catalyst or emission control device coupled to the second bank. Still further, in other examples, the selection may additionally or alternatively be based on whether or not a particular cylinder or cylinders of the engine are indicated as being prone or susceptible to unintended combustion while deactivated. More specifically, in one example, cylinder(s) that are indicated as being prone to unintended combustion while deactivated may be designated as cylinder(s) that cannot be deactivated. Such an example may include cylinder(s) indicated to be prone to unintended combustion under conditions where the cylinder(s) are deactivated via trapping vacuum, or trapping positive pressure. In other examples, if a particular cylinder or cylinders are indicated as being prone to unintended combustion when deactivated via trapping vacuum, such a cylinder or cylinders may still be deactivated via trapping positive pressure. In other words, the conditions that led to unintended combustion when the cylinder or cylinder(s) were deactivated with trapped vacuum may not inherently result in unintended combustion when the cylinder is deactivated in a different way (trapping positive pressure versus vacuum), and thus, in some examples a cylinder or cylinders that exhibit unintended combustion when deactivated via trapping vacuum may be deactivated via trapping positive pressure. However, in other examples, as discussed, if a cylinder or cylinders are indicated to result in unintended combustion while deactivated, regardless of how the deactivation is conducted (e.g. trapping vacuum or trapping positive pressure), then such a cylinder or cylinders may be designated as non-deactivatable.

With the cylinder(s) determined to be deactivated at 855, method 850 may proceed to 860. At 860, method 850 may include deactivating the selected cylinders to trap positive pressure in the cylinder(s). It may be understood that there may be two ways of trapping positive pressure in a cylinder selected for deactivation. In one example, an air charge may be inducted into the cylinder via an open intake valve, but rather than provided fueling and spark, the air charge may be trapped in the cylinder via closing the intake valve, without correspondingly opening the exhaust valve. In some examples, such an approach may be utilized provided that oil quality is less than the oil quality threshold, but greater than a second oil quality threshold. The second example of how a positive pressure may be trapped in the cylinder may comprise inducting an air/fuel charge, and providing spark, but not exhausting the combusted air and fuel, thus trapping a high pressure charge. Such examples have been discussed above in detail with regard to FIG. 3B.

Thus, as discussed, at 860, method 850 may include trapping positive pressure with respect to atmospheric pressure in one or more cylinders selected for deactivation. Proceeding to 865, method 850 may include indicating whether conditions are met for spark plug cleaning or not. It may be understood that, in this example, spark plug cleaning may comprise providing spark to deactivated cylinder(s), such that spark plug fouling may be reduced or avoided. When trapping positive pressure in the cylinder, such potential for spark plug fouling may be reduced as compared to when a cylinder or cylinders are deactivated via trapping vacuum, due to the lowered potential for crankcase vapors and oil migration to the deactivated cylinder(s). However, over time positive pressure in deactivated cylinder(s) may bleed down, the cylinder(s) may cool, and as such, migration of oil and crankcase vapors may be more likely. Thus, conditions being met for spark plug cleaning may include a threshold duration of time elapsing since the cylinder(s) were deactivated. Conditions being met for spark plug cleaning may additionally or alternatively include an indication that a threshold number of engine cycles has occurred since the cylinder(s) were deactivated.

If, at 865, conditions are not indicated to be met for conducting spark plug cleaning, method 850 may proceed to 868, where it may be indicated as to whether non-VDE mode conditions are met. As discussed above, non-VDE mode conditions (e.g. reactivation conditions) may be met when engine torque demand increases above a threshold. In another example, reactivation conditions may be considered met when the engine has operated in the VDE mode for a specified duration. Accordingly, at 868, non-VDE conditions may be confirmed. If non-VDE conditions are not confirmed, the engine may continue to be operated in the VDE mode with the selected one or more cylinders deactivated (e.g. intake and exhaust valve(s) closed, with fueling to the deactivated cylinder(s) stopped).

Alternatively, upon confirming non-VDE conditions at 868, the deactivated cylinder(s) may be reactivated at 870. Specifically, the deactivated fuel injector(s) may be reactivated, and spark may be provided to the deactivated engine cylinder(s). Reactivation of the deactivated engine cylinder(s) may comprise commanding spark to the reactivated cylinder(s) near TDC (e.g. just prior or within a threshold number of degrees of TDC).

In response to reactivation of the engine cylinders at 870, method 850 may proceed to 872. At 872, method 850 may include updating vehicle operating parameters. For example, updating vehicle operating parameters at 872 may include storing information collected during the time that the engine was operated in the VDE mode at the controller. More specifically, such information may include what cylinder(s) were deactivated, how long the deactivation of cylinder(s) occurred, and that conditions were not met for spark plug cleaning. Such information may be stored at the controller, and may be utilized for subsequent cylinder deactivation events.

Returning to 865, in response to conditions being met for spark plug cleaning, method 850 may proceed to 876. At 876, method 850 may include providing spark near BDC for each cylinder that has been selectively deactivated, as discussed above at step 816 of method 800. The remaining steps (878-886) of method 850 have been described above at method 800 with regard to steps 818-828), and thus will only be described briefly here. With spark provided near BDC at 876, method 800 may include monitoring crankshaft acceleration at 878. Proceeding to 880, in response to crankshaft acceleration greater than the predetermined crankshaft acceleration threshold discussed above, or in other words, in response to an unintended combustion event, method 850 may proceed to 882. At 882, method 850 may include determining the next firing cylinder based on firing order of activated cylinders, and at 884 method 850 may include retarding spark for the determined next firing cylinder, such that an average torque from the unintended and reduced torque combustion event (from the retarded spark on the next firing cylinder) is equal to an average requested torque output of the engine. By retarding spark for the determined next firing cylinder, a torque bump that would otherwise be present due to the unintended combustion, may be reduced or avoided.

Proceeding to 886, method 800 may include reactivating deactivated cylinder(s), and reassigning cylinders to be deactivated. In this example method 850, it may be understood that deactivating cylinders may include trapping positive pressure in the selected cylinder(s), as opposed to trapping vacuum in the cylinder(s), as oil quality is below the oil quality threshold. In reactivating the deactivated cylinder that was the source of the unintended combustion event, it may be understood that the residual burnt gas from the unintended combustion event may first be exhausted to the exhaust system, prior to inducting an air/fuel charge and initiating combustion by providing spark.

Furthermore, it may be understood that, in reassigning cylinders to be deactivated, and cylinders to be activated, any cylinder(s) previously indicated to be prone to unintended combustion may be designated as non-deactivatable. In other words, such cylinders may remain activated during the reassigning of cylinders at step 886 of method 850. However, as discussed, in other examples such action may depend on whether such cylinder(s) were previously indicated to be susceptible to unintended combustion while deactivated via trapping vacuum, or deactivated via trapping positive pressure in the cylinder(s). In some examples where the cylinder(s) have previously been implicated as being prone to unintended combustion, but where such an indication occurred while the cylinder(s) were deactivated to trap vacuum, then such cylinder(s) may be prevented from being deactivated to trap vacuum, but may still be deactivated to trap positive pressure. However, in such an example, any cylinder(s) previously indicated to be prone to unintended combustion while deactivated to trap positive pressure, may be prevented from being deactivated subsequently either via trapping vacuum or positive pressure. In any event, responsive to mitigating the torque bump due to unintended combustion, and further responsive to reassigning engine cylinders for deactivation/reactivation, method 850 may continue to monitor crankshaft acceleration for unintended combustion events.

Under conditions where further unintended combustion events are not indicated, method 850 may proceed to 868, and may include indicating whether non-VDE mode conditions are met, as discussed above. If not, method 850 may continue to operate the engine in the VDE mode of operation. Alternatively, in response to non-VDE conditions being met, method 850 may proceed to 870, and may include reactivating the deactivated cylinder(s) via providing fuel and spark to said cylinder(s).

Proceeding to 872, method 850 may include updating vehicle operating parameters. Updating vehicle operating parameters at 872 may include storing at the controller which cylinder(s) produced unintended combustion event(s) during operating the engine in the VDE mode. Such information may be utilized for subsequent cylinder deactivation events. In some examples, updating vehicle operating parameters at 872 may include setting a MIL at the dash, to alert a vehicle operator of a request to service the vehicle. Furthermore, updating vehicle operating parameters at 872 may include designating one or more cylinders as being non-deactivatable, due to the unintended combustion event(s). More specifically, because unintended combustion was detected even when a positive pressure was trapped in the cylinder(s), then it may be highly likely that unintended combustion may occur subsequently if vacuum were trapped in the cylinder at deactivation, or if positive pressure were again trapped at deactivation. Thus, while in some examples a cylinder that exhibited unintended combustion under conditions where the cylinder was deactivated by trapping vacuum may still be deactivated via trapping positive pressure, in a situation where unintended combustion was detected under conditions where positive pressure was trapped at deactivation, such a cylinder may be designated as non-deactivatable, as discussed.

While the above description with regard to methods of FIGS. 8A-8B include methods for reducing a torque bump resulting from unintended combustion in engine cylinders where, in some examples, spark is provided near BDC for deactivated cylinders, it may be understood that such methodology may not be limited to conditions where spark is provided near BDC for deactivated cylinders. In some examples, such methodology may be utilized under conditions where spark is provided at other predetermined positions that do not necessarily include sparking near BDC (e.g. within the threshold number of degrees of BDC). In other words, such methodology for reducing a torque bump and for reassigning activated/deactivated cylinders subsequent to the unintended combustion is not limited to situations where spark is provided to deactivated cylinder(s) near BDC, without departing from the scope of this disclosure.

Furthermore, it is herein recognized that determining whether to trap negative pressure or positive pressure in the cylinder(s) scheduled for deactivation may be in some examples independent of oil quality, without departing from the scope of this disclosure. In other words, methods for reducing or avoiding a torque bump resulting from unintended combustion in a deactivated cylinder may be applicable to deactivated cylinders that have been deactivated independent of oil quality (via trapping positive pressure or negative pressure at deactivation). Furthermore, in some examples, methods for reducing or avoiding spark plug fouling may be conducted irrespective of oil quality, without departing from the scope of this disclosure.

Thus, the methods of FIGS. 8A-8B may enable a method comprising with a first set of cylinders of an engine deactivated and with a second set of cylinders activated to combust air and fuel, monitoring acceleration of a crankshaft coupled to the engine. In response to acceleration of the crankshaft greater than a crankshaft acceleration threshold, the method may include retarding a spark provided via an activated cylinder included in the second set of cylinders, the activated cylinder comprising a cylinder scheduled to combust air and fuel immediately following the acceleration of the crankshaft greater than the crankshaft acceleration threshold. The method may further include reactivating a deactivated cylinder responsible for the acceleration of the crankshaft greater than the crankshaft acceleration threshold and deactivating a cylinder from the second set of cylinders.

In such a method, retarding the spark may include retarding the spark a determined amount, the determined amount a function of an amount of acceleration of the crankshaft. Furthermore, in such a method, retarding the spark may offset a torque increase of the engine due to acceleration of the crankshaft greater than the crankshaft acceleration threshold, which in turn may reduce or avoid a torque bump otherwise associated with the torque increase of the engine.

Such a method may further comprise reactivating all of the first set of deactivated cylinders, and deactivating all of the second set of activated cylinders, just after retarding the spark provided via the activated cylinder included in the second set of cylinders.

Furthermore, in such a method, residual burnt gas from the deactivated cylinder responsible for the acceleration of the crankshaft greater than the crankshaft acceleration threshold is first exhausted from the deactivated cylinder just prior to reactivating the deactivated cylinder.

Still further, in such a method, deactivating the first set of cylinders may include stopping fuel injection and sealing the first set of cylinders, and may further comprise providing spark to the first set of deactivated cylinders at a predetermined position of one or more pistons coupled to the first set of deactivated cylinders, where providing spark may be a function of at least pressure in the first set of deactivated cylinders.

Turning now to FIG. 9, an example map 900 is shown. Specifically, map 900 depicts a drive cycle where a particular cylinder is deactivated by trapping vacuum in the cylinder, and where spark plug cleaning is conducted by providing spark at BDC while the cylinder is deactivated. Further, map 900 depicts an unintended combustion event while the cylinder is deactivated, thus map 900 further depicts exhausting residual burnt gas from the combustion event and then reactivating the cylinder subsequent to the unintended combustion event. Similar to that discussed above at FIGS. 4-7, a single engine cylinder is depicted at FIG. 9, for clarity. Map 900 includes a number of engine cycles that include four strokes, depicted as E, I, C, and P, corresponding to exhaust, intake, compression, and power strokes, respectively. Furthermore, similar to FIGS. 4-7, map 900 illustrates engine position, showing where TDC (T) and BDC (B) are in relation to each engine cycle. Map 900 includes plot 905, indicating valve timing. For example map 700, it may be understood that a valve shown opening and closing during the exhaust stroke (E) corresponds to an exhaust valve 906 for the cylinder, and a valve shown opening and closing during the intake stroke (I) corresponds to an intake valve 907 for the cylinder. Map 900 further includes plot 910, indicating piston position in relation to the engine cycles. Map 900 further includes plot 915, indicating spark ignition energy, in relation to the engine cycles. Map 900 further includes plot 920, indicating whether fuel injection to the engine cylinder is on, or off, in relation to the engine cycles. Map 900 further includes plot 925, indicating whether an unintended combustion event is indicated, in relation to the engine cycles.

It may be understood that map 900 depicts a portion of a single drive cycle, the portion of the single drive cycle divided up into three segments, which will be elaborated upon below.

Segment 1 illustrates a portion of the drive cycle where VDE conditions are met, and, while not explicitly illustrated, it may be understood that oil quality is above the threshold oil quality. Furthermore, it may be understood that the cylinder illustrated at map 900 comprises a cylinder selected for deactivation. Accordingly, with oil quality above the threshold, the exhaust valve opens and then closes, to deactivate the cylinder. In other words, it may be understood that the exhaust valve opens to route combusted gases out of the cylinder, and then the exhaust valve closes, thus trapping a vacuum in the cylinder. As discussed above, trapping vacuum inside the cylinder may result in oil migration to the cylinder, which may result in fouling of the spark plug. Thus, to mitigate such an issue, as illustrated at map 900, spark is provided at every other BDC occasion while the cylinder is deactivated. It may be understood in example map 900 that the spark provided comprises the basal spark ignition energy. By continuing to spark near BDC while fueling is cut off from the deactivated cylinder, and with the vacuum trapped in the sealed cylinder (intake and exhaust valves closed), fouling of the spark plug may be prevented or reduced during segment 1 of the drive cycle.

However, during segment 2 of the portion of the drive cycle represented by map 900, an unintended combustion event is detected (plot 925). As discussed above, unintended combustion may be indicated via crankshaft acceleration greater than a predetermined crankshaft acceleration threshold while the engine is operating in VDE mode. Accordingly, as discussed above with regard to method 800 depicted at FIG. 8A, the cylinder is reactivated during segment 3 of the portion of the drive cycle depicted by map 900. More specifically, in response to the indication of unintended combustion, the cylinder is reactivated during segment 3 by first opening the exhaust valve, which may exhaust residual burnt gas from the cylinder. Once the residual burnt gas from the unintended combustion event is exhausted, the induction of air and fueling is resumed. Furthermore, spark is provided near TDC, of the compression stroke, instead of BDC. Thus, for the remainder of segment 3, the previously deactivated cylinder is activated to combust air and fuel. Furthermore, while fuel injection to the reactivated cylinder is illustrated as occurring during the compression stroke, fuel injection may be provided during the intake stroke.

In this way, a deactivated cylinder that experiences unintended combustion while providing spark near BDC may be reactivated in a way that ensures residual burnt gas from the unintended combustion event does not remain in the cylinder upon reactivation, thus increasing a likelihood for achieving desired combustion efficiency upon reactivation.

Thus, map 900 specifically depicts how a particular deactivated cylinder may be reactivated in response to an indication of unintended combustion. For clarity, only a single engine cylinder is depicted at map 900. However, as discussed above with regard to FIG. 8A, the unintended combustion while a cylinder is deactivated may result in a torque bump, if mitigating action is not undertaken. Such mitigating action may include retarding spark on the next cylinder scheduled for firing after the unintended combustion event, as discussed. Accordingly, FIG. 10 depicts an example timeline 1000 depicting how mitigating action may be taken to reduce or avoid the torque bump that would otherwise be present in response to unintended combustion while the engine is being operated in VDE-mode.

Thus, turning to FIG. 10, example timeline 1000 includes plot 1005, depicting valve timing for a first cylinder (C1) of an engine, over time. Illustrated for plot 1005 is a number of strokes of the engine, including exhaust (E), intake (I), compression (C), and power (P) strokes. Exhaust valve opening/closing is depicted by line(s) 1006, occurring during the exhaust stroke, while intake valve opening/closing is depicted by line(s) 1007, occurring during the intake stroke. Timeline 1000 further includes plot 1010, indicating piston position for a piston coupled to C1, over time. The piston may be at top dead center (TDC), bottom dead center (BDC), or somewhere in between. Timeline 1000 further includes plot 1015, indicating spark energy provided via a spark plug coupled to C1, over time. Timeline 1000 further includes plot 1020, indicating fuel injection provided to C1, over time. Timeline 1000 further includes plot 1025, indicating whether unintended combustion for C1 is indicated, over time. Unintended combustion may be indicated, as discussed, via monitoring crankshaft acceleration while the engine is being operated in VDE-mode. In response to crankshaft acceleration greater than a predetermined crankshaft acceleration threshold, an unintended combustion event may be indicated.

Timeline 1000 further includes plot 1030, indicating valve timing for a second cylinder (C2) of the engine, over time. Illustrated for plot 1030, similar to that of plot 1005, is a number of strokes of the engine, including exhaust (E), intake (I), compression (C), and power (P) strokes. Exhaust valve opening/closing is depicted by line(s) 1032, while intake valve opening/closing is depicted by line(s) 1031. Timeline 1000 further includes plot 1035, indicating piston position for a piston coupled to C2, over time. The piston may be at TDC, BDC, or somewhere in between. Timeline 1000 further includes plot 1040, indicating spark energy provided via a spark plug coupled to C2, over time. As will be discussed below, mitigating action in response to unintended combustion while the engine is operating in VDE mode may include retarding spark for C2, thus a non-retarded spark position is indicated, for clarity, via dashed plot 1045. Timeline 1000 further includes plot 1050, indicating fuel injection provided to C2, over time.

It may be understood that C1 and C2 are arbitrary designations, and specifically, as will be discussed below, C1 comprises a cylinder that is deactivated but which experiences unintended combustion while deactivated. C2 comprises the next firing cylinder, or cylinder scheduled to fire just after the unintended combustion event has occurred for C1. Other cylinders of the engine may be deactivated, and still others may be activated, as discussed above. In other words, only C1 and C2 are shown for clarity.

At time t0, it may be understood that C1 is already deactivated (plot 1005), with vacuum trapped in the cylinder. Accordingly, between time t0 and t1, exhaust valve (line 1006) and intake valve (line 1007) are maintained closed, thus maintaining C1 sealed. With C1 deactivated to trap vacuum, in this example timeline 1000, spark is provided near BDC at every other BDC occasion.

Further, at time t0, C2 is activated, or in other words is in operation to combust air and fuel. Thus, the exhaust valve (line 1032) opens during the exhaust stroke between time t0 and t1, and the intake valve (line 1031) opens during the intake stroke between time t0 and t1. Further, fuel (plot 1050) and spark (plot 1040) is provided to C2 between time t0 and t1. In this example timeline 1000, fuel is provided during the intake stroke. However, in other examples fuel may be provided during the compression stroke, without departing from the scope of this disclosure.

At time t1, unintended combustion is detected corresponding to unintended combustion at C1. With unintended combustion indicated at C1, the next firing cylinder (C2) is determined via the controller. To mitigate a potential torque bump due to the unintended combustion event (the torque bump resulting from crankshaft acceleration greater than desired), spark is retarded to C2 at time t2, immediately following the unintended combustion event at time t1. For illustrative purposes, non-retarded spark timing is illustrated by plot 1045. By retarding spark (corresponding to a reduced torque combustion event) for the next firing cylinder C2 after the C1 unintended combustion event, an average torque from the unintended combustion event and the reduced torque combustion event may be equal to an average requested torque output of the engine. In this way, the torque bump that may otherwise result from unintended combustion, may be reduced or avoided.

Mitigating action in response to the unintended combustion event may further include reactivating the deactivated cylinder responsible for the unintended combustion event, and deactivating another cylinder. As discussed above, in some examples, such action may include reactivating the deactivated cylinder responsible for the unintended combustion event, and reactivating any other deactivated cylinders (not responsible for the unintended combustion). Such action may further include deactivating more than one cylinder that is activated. In other words, one set of deactivated cylinder may be reactivated, and another set of activated cylinders may be deactivated. In this example timeline 1000, only two cylinders are shown, for clarity.

Thus, reactivating the deactivated cylinder may include, at time t3, subsequent to taking mitigating action to reduce or avoid the torque bump, opening the exhaust valve corresponding to C1, thus exhausting residual burnt gas from C1. Responsive to exhausting the residual burnt gas from C1, at time t4 the intake valve corresponding to C1 opens, drawing air into C1. At time t5, fuel is provided to C1, and at time t6, spark is provided to C1 near when the piston coupled to C1 is near TDC. Between time t6 and t7, C1 remains activated to combust air and fuel.

Returning to time t4, subsequent to retarding spark for C2 in order to mitigate the torque bump due to unintended combustion at C1, C2 is scheduled for deactivation. In this example timeline, the deactivation corresponds to trapping vacuum in the cylinder. Accordingly, at time t4, the exhaust valve (line 1032) is opened and then closed, and subsequently, the intake valve is not opened. After deactivation of C2, between time t4 and t7, spark is provided to the deactivated C2 near every other BDC occasion, in order to prevent spark plug fouling of C2. Furthermore, while not explicitly illustrated, it may be understood that no unintended combustion events are detected at deactivated C2 for the duration of timeline 1000. Furthermore, it may be understood that timeline 1000 depicts a situation where only a portion of the drive cycle is shown, and thus reactivation of C2 in response to non-VDE conditions being indicated is not illustrated. However, it may be understood that upon indication of non-VDE mode conditions being met, C2 (and any other deactivated cylinders), may be reactivated as discussed above.

In this way, in response to a crankshaft acceleration greater than a crankshaft acceleration threshold arising from unintended combustion in a deactivated cylinder of a variable displacement engine, a torque bump may be reduced or avoided by retarding a spark provided to an activated cylinder scheduled to combust air and fuel immediately following the unintended combustion event. By reducing or avoiding the torque bump, customer satisfaction may be improved, and engine efficiency and fuel economy may be increased.

A technical effect is to recognize that by retarding spark in the activated cylinder scheduled to fire immediately following the unintended combustion event, such a torque bump may be reduced or avoided. Another technical effect is to recognize that crankshaft acceleration may be utilized as a readout for whether or not unintended combustion occurs in a deactivated cylinder. A further technical effect is to recognize that, in response to an unintended combustion event, exhausting residual combustion gases resulting from the unintended combustion prior to reactivating the cylinder may improve combustion for the cylinder responsible for the unintended combustion. A still further technical effect is to recognize that it may be beneficial to designate any cylinders prone to unintended combustion while deactivated as either non-deactivatable, or to designate such cylinders as deactivatable only via trapping positive pressure with respect to atmospheric pressure subsequent to the particular cylinder(s) being indicated as prone to unintended combustion. A still further technical effect is to recognize that, in response to unintended combustion while the engine is being operated in VDE-mode, it may be desirable to reassign the deactivated cylinders to become activated cylinders, and to reassign the activated cylinder to become deactivated cylinders. A still further technical effect is to recognize that such unintended combustion events may be reduced or avoided by providing spark near BDC for deactivated cylinders. A still further technical effect is to recognize that, for such a variable displacement engine, determining how (e.g. trapping a negative pressure or a positive pressure with respect to atmospheric pressure) to deactivate cylinders selected for deactivation may be a function of a quality of oil used for cooling, lubrication and/or cleaning of the engine.

The systems described herein, and with reference to FIGS. 1-2, along with the methods described herein, and with reference to FIGS. 3A-3B and FIGS. 8A-8B, may enable one or more systems and one or more methods. In one example, a method comprises deactivating a subset of cylinders of a variable displacement engine while other cylinders of the engine combust air and fuel; reducing or avoiding a torque bump due to an unintended combustion event in a deactivated cylinder by reducing a torque output of the engine and reactivating the deactivated cylinder which had the unintended combustion event; and during subsequent cylinder deactivation events, not deactivating the cylinder which had the unintended combustion event. In a first example of the method, the method further includes where the unintended combustion event includes an acceleration of a crankshaft coupled to the engine greater than a threshold crankshaft acceleration. A second example of the method optionally includes the first example, and further comprises exhausting residual burnt gas from the deactivated cylinder with the unintended combustion event prior to reactivating the deactivated cylinder with the unintended combustion event. A third example of the method optionally includes any one or more or each of the first and second examples, and further includes wherein reducing the torque output of the engine comprises reducing a torque contribution of an activated cylinder that is scheduled to combust air and fuel immediately following the unintended combustion event. A fourth example of the method optionally includes any one or more or each of the first through third examples, and further includes wherein reducing the torque contribution of the activated cylinder further comprises retarding a spark provided to the activated cylinder for combustion of air and fuel, where an amount that the spark is retarded is a function of a torque increase provided to the engine via the unintended combustion event. A fifth example of the method optionally includes any one or more or each of the first through fourth examples, and further comprises deactivating the subset of cylinders of the engine via trapping either a negative pressure with respect to atmospheric pressure or a positive pressure with respect to atmospheric pressure in the subset of cylinders. A sixth example of the method optionally includes any one or more or each of the first through fifth examples, and further includes wherein trapping the negative pressure is in response to an indication that an oil quality of an oil utilized for cooling, lubrication and/or cleaning of the engine is greater than an oil quality threshold, and wherein trapping the positive pressure is in response to an indication that the oil quality of the oil is below the oil quality threshold. A seventh example of the method optionally includes any one or more or each of the first through sixth examples, and further comprises providing spark to the subset of deactivated cylinders at a predetermined position of one or more pistons coupled to the subset of deactivated cylinders, wherein providing spark is further a function of pressure in the subset of deactivated cylinders; and wherein providing spark serves to prevent fouling of one or more spark plugs configured to provide spark to the subset of deactivated cylinders. An eighth example of the method optionally includes any one or more or each of the first through seventh examples, and further includes wherein the predetermined position of the one or more pistons further comprises a position within a threshold number of degrees from a bottom dead center position. A ninth example of the method optionally includes any one or more or each of the first through eighth examples, and further includes wherein reactivating the deactivated cylinder further comprises reactivating the subset of deactivated cylinders including the deactivated cylinder which had the unintended combustion event, and deactivating the other cylinders of the engine operating to combust fuel.

Another example of a method comprises, with a first set of cylinders of an engine deactivated and with a second set of cylinders activated to combust air and fuel, monitoring acceleration of a crankshaft coupled to the engine and in response to acceleration of the crankshaft greater than a crankshaft acceleration threshold, retarding a spark provided via an activated cylinder included in the second set of cylinders, the activated cylinder comprising a cylinder scheduled to combust air and fuel immediately following the acceleration of the crankshaft greater than the crankshaft acceleration threshold; and reactivating a deactivated cylinder responsible for the acceleration of the crankshaft greater than the crankshaft acceleration threshold and deactivating a cylinder from the second set of cylinders. In a first example of the method, the method further includes wherein retarding the spark includes retarding the spark a determined amount, the determined amount a function of an amount of acceleration of the crankshaft. A second example of the method optionally includes the first example, and further includes wherein retarding the spark offsets a torque increase of the engine due to acceleration of the crankshaft greater than the crankshaft acceleration threshold, which in turn reduces or avoids a torque bump otherwise associated with the torque increase of the engine. A third example of the method optionally includes any one or more or each of the first through second examples, and further comprises reactivating all of the first set of deactivated cylinders, and deactivating all of the second set of activated cylinders, just after retarding the spark provided via the activated cylinder included in the second set of cylinders. A fourth example of the method optionally includes any one or more or each of the first through third examples, and further includes wherein residual burnt gas from the deactivated cylinder responsible for the acceleration of the crankshaft greater than the crankshaft acceleration threshold is first exhausted from the deactivated cylinder just prior to reactivating the deactivated cylinder. A fifth example of the method optionally includes any one or more or each of the first through fourth examples, and further includes wherein deactivating the first set of cylinders includes stopping fuel injection and sealing the first set of cylinders, and further comprising providing spark to the first set of deactivated cylinders at a predetermined position of one or more pistons coupled to the first set of deactivated cylinders, where providing spark is a function of at least pressure in the first set of deactivated cylinders.

An example of a system for a vehicle comprises a variable displacement engine, including a set of cylinders and where each cylinder is coupled to a fuel injector and a spark plug, and where each cylinder includes a piston; a crankshaft mechanically coupled to the variable displacement engine; a crankshaft position sensor; and a controller, storing instructions in non-transitory memory that, when executed, cause the controller to: deactivate a first subset of cylinders that includes one or more cylinders from the set of cylinders in response to predetermined conditions being met, where deactivating the first subset of cylinders includes at least sealing and stopping providing fuel injection to the first subset of cylinders; maintaining a second subset of cylinders that includes one or more cylinders from the set of cylinders activated to combust air and fuel; monitor acceleration of the crankshaft while the first subset of cylinders is deactivated; and in response to acceleration of the crankshaft greater than a crankshaft acceleration threshold, retarding a spark provided to an activated cylinder included in the second subset of cylinders, the activated cylinder comprising a cylinder scheduled to combust air and fuel immediately following the acceleration of the crankshaft greater than the crankshaft acceleration threshold, and assigning the first subset of cylinders to be reactivated to combust air and fuel and the second subset of cylinders to be deactivated, immediately following retarding the spark provided to the activated cylinder. In a first example of the system, the system further includes wherein the acceleration of the crankshaft greater than the crankshaft acceleration threshold is a result of an unintended combustion in a deactivated cylinder included in the first subset of cylinders; and wherein the controller stores further instructions to exhaust residual burnt gas in the deactivated cylinder resulting from the unintended combustion prior to reactivating the first subset of cylinders including the deactivated cylinder. A second example of the system optionally includes the first example, and further includes wherein the controller stores further instructions to provide spark to the first subset of cylinders while the first subset is deactivated, and to provide spark to the second subset of cylinders while the second subset is deactivated, where providing spark includes providing spark when pistons coupled to cylinders included in the first subset and/or the second subset are at predetermined positions in relation to the crankshaft. A third example of the system optionally includes any one or more or each of the first through second examples, and further comprises an oil quality sensor; and wherein the controller stores further instructions to deactivate the first subset and/or the second subset of cylinders by trapping a negative pressure with respect to atmospheric pressure in the first subset and/or second subset of cylinders in response to an indication that an oil quality of an oil utilized for cooling, lubrication and/or cleaning of the variable displacement engine is greater than an oil quality threshold, and to deactivate the first subset and/or the second subset of cylinders by trapping a positive pressure with respect to atmospheric pressure in the first subset and/or the second subset of cylinders in response to an indication that the oil quality is below the oil quality threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
deactivating a subset of cylinders of a variable displacement engine while other cylinders of the engine combust air and fuel;
reducing or avoiding a torque bump due to an unintended combustion event in a deactivated cylinder by reducing a torque output of the engine and reactivating the deactivated cylinder which had the unintended combustion event, wherein reducing the torque output of the engine includes reducing a torque contribution of an activated cylinder that is scheduled to combust air and fuel following the unintended combustion event; and
during subsequent cylinder deactivation events, not deactivating the cylinder which had the unintended combustion event.

2. The method of claim 1, where the unintended combustion event includes an acceleration of a crankshaft coupled to the engine greater than a threshold crankshaft acceleration.

3. The method of claim 1, further comprising exhausting residual burnt gas from the deactivated cylinder with the unintended combustion event prior to reactivating the deactivated cylinder with the unintended combustion event.

4. The method of claim 1, wherein reducing the torque contribution of the activated cylinder further comprises retarding a spark provided to the activated cylinder for combustion of air and fuel, where an amount that the spark is retarded is a function of a torque increase provided to the engine via the unintended combustion event.

5. The method of claim 1, further comprising deactivating the subset of cylinders of the engine via trapping either a negative pressure with respect to atmospheric pressure or a positive pressure with respect to atmospheric pressure in the subset of cylinders.

6. The method of claim 5, wherein trapping the negative pressure is in response to an indication that an oil quality of an oil utilized for cooling, lubrication, and/or cleaning of the engine is greater than an oil quality threshold, and wherein trapping the positive pressure is in response to an indication that the oil quality of the oil is below the oil quality threshold.

7. The method of claim 5, further comprising providing spark to the subset of deactivated cylinders at a predetermined position of one or more pistons coupled to the subset of deactivated cylinders, wherein providing spark is further a function of pressure in the subset of deactivated cylinders; and
wherein providing spark serves to prevent fouling of one or more spark plugs configured to provide spark to the subset of deactivated cylinders.

8. The method of claim 7, wherein the predetermined position of the one or more pistons further comprises a position within a threshold number of degrees from a bottom dead center position.

9. The method of claim 1, wherein reactivating the deactivated cylinder further comprises reactivating the subset of deactivated cylinders including the deactivated cylinder which had the unintended combustion event, and deactivating the other cylinders of the engine operating to combust fuel.

10. A method, comprising:
with a first set of cylinders of an engine deactivated and with a second set of cylinders activated to combust air and fuel, monitoring acceleration of a crankshaft coupled to the engine and in response to acceleration of the crankshaft greater than a crankshaft acceleration threshold resulting from an unintended combustion event in a deactivated cylinder, retarding a spark provided via an activated cylinder included in the second set of cylinders, the activated cylinder comprising a cylinder scheduled to combust air and fuel immediately following the acceleration of the crankshaft greater than the crankshaft acceleration threshold; and
reactivating the deactivated cylinder responsible for the acceleration of the crankshaft greater than the crankshaft acceleration threshold and deactivating a cylinder from the second set of cylinders.

11. The method of claim 10, wherein retarding the spark includes retarding the spark a determined amount, the determined amount a function of an amount of acceleration of the crankshaft.

12. The method of claim 10, wherein retarding the spark offsets a torque increase of the engine due to acceleration of the crankshaft greater than the crankshaft acceleration threshold, which in turn reduces or avoids a torque bump otherwise associated with the torque increase of the engine.

13. The method of claim 10, further comprising reactivating all of the first set of deactivated cylinders, and deactivating all of the second set of activated cylinders, just after retarding the spark provided via the activated cylinder included in the second set of cylinders.

14. The method of claim 10, wherein residual burnt gas from the deactivated cylinder responsible for the acceleration of the crankshaft greater than the crankshaft acceleration threshold is first exhausted from the deactivated cylinder just prior to reactivating the deactivated cylinder.

15. The method of claim 10, wherein deactivating the first set of cylinders includes stopping fuel injection and sealing the first set of cylinders, and further comprising providing spark to the first set of deactivated cylinders at a predetermined position of one or more pistons coupled to the first set of deactivated cylinders, where providing spark is a function of at least pressure in the first set of deactivated cylinders.

16. A system for a vehicle, comprising:
a variable displacement engine, including a set of cylinders and where each cylinder is coupled to a fuel injector and a spark plug, and where each cylinder includes a piston;
a crankshaft mechanically coupled to the variable displacement engine;
a crankshaft position sensor; and
a controller, storing instructions in non-transitory memory that, when executed, cause the controller to:
deactivate a first subset of cylinders that includes one or more cylinders from the set of cylinders in response to predetermined conditions being met, where deactivating the first subset of cylinders includes at least sealing and stopping providing fuel injection to the first subset of cylinders;
maintaining a second subset of cylinders that includes one or more cylinders from the set of cylinders activated to combust air and fuel;
monitor acceleration of the crankshaft while the first subset of cylinders is deactivated; and
in response to acceleration of the crankshaft greater than a crankshaft acceleration threshold resulting from unintended combustion in a deactivated cylinder included in the first subset of cylinders, retarding a spark provided to an activated cylinder included in the second subset of cylinders, the activated cylinder comprising a cylinder scheduled to combust air and fuel immediately following the acceleration of the crankshaft greater than the crankshaft acceleration threshold, and assigning the first subset of cylinders to be reactivated to combust air and fuel and the second subset of cylinders to be deactivated, immediately following retarding the spark provided to the activated cylinder.

17. The system of claim 16,
wherein the controller stores further instructions to exhaust residual burnt gas in the deactivated cylinder resulting from the unintended combustion prior to reactivating the first subset of cylinders including the deactivated cylinder.

18. The system of claim 16, wherein the controller stores further instructions to provide spark to the first subset of cylinders while the first subset is deactivated, and to provide spark to the second subset of cylinders while the second subset is deactivated, where providing spark includes providing spark when pistons coupled to cylinders included in the first subset and/or the second subset are at predetermined positions in relation to the crankshaft.

19. The system of claim 16, further comprising:
an oil quality sensor; and
wherein the controller stores further instructions to deactivate the first subset and/or the second subset of cylinders by trapping a negative pressure with respect to atmospheric pressure in the first subset and/or the second subset of cylinders in response to an indication that an oil quality of an oil utilized for cooling, lubrication, and/or cleaning of the variable displacement engine is greater than an oil quality threshold, and to deactivate the first subset and/or the second subset of cylinders by trapping a positive pressure with respect to atmospheric pressure in the first subset and/or the second subset of cylinders in response to an indication that the oil quality is below the oil quality threshold.

* * * * *